United States Patent
Yun et al.

(10) Patent No.: US 11,538,136 B2
(45) Date of Patent: Dec. 27, 2022

(54) SYSTEM AND METHOD TO PROCESS IMAGES OF A VIDEO STREAM

(71) Applicant: QUALCOMM Incorporated, San Diego, CA (US)

(72) Inventors: Stone Yun, Markham (CA); Alireza Shoa Hassani Lashdan, Burlington (CA); Darren Gnanapragasam, Aurora (CA); David Hansen, Calgary (CA)

(73) Assignee: Qualcomm Incorporated, San Diego, CA (US)

( * ) Notice: Subject to any disclaimer, the term of this patent is extended or adjusted under 35 U.S.C. 154(b) by 234 days.

(21) Appl. No.: 17/083,146

(22) Filed: Oct. 28, 2020

(65) Prior Publication Data

US 2022/0130015 A1    Apr. 28, 2022

(51) Int. Cl.
*G06T 5/00* (2006.01)
*G06T 5/50* (2006.01)

(52) U.S. Cl.
CPC .............. *G06T 5/002* (2013.01); *G06T 5/50* (2013.01); *G06T 2207/10016* (2013.01); *G06T 2207/20081* (2013.01); *G06T 2207/20084* (2013.01)

(58) Field of Classification Search
CPC . G06T 5/002; G06T 5/50; G06T 2207/10016; G06T 2207/20081;
(Continued)

(56) References Cited

U.S. PATENT DOCUMENTS 9,686,537 B2 *   6/2017 Geiss ................... H04N 17/002
2008/0279283 A1 * 11/2008 Weinstock ............ H04N 19/86
                                                           375/240.27
(Continued)

FOREIGN PATENT DOCUMENTS

WO    2020227179 A1    11/2020

OTHER PUBLICATIONS

Cui K., et al., "Decoder Side Image Quality Enhancement Exploiting Inter-Channel Correlation in a 3-Stage CNN: Submission to CLIC 2018 Decoder Side Image Quality Enhancement Exploiting Inter-Channel Correlation in a 3-stage CNN: Submission to CLIC 2018", Jun. 1, 2018 (Jun. 1, 2018), pp. 2571-2574, XP055819365, Retrieved from the Internet: URL:https://www.researchgate.net/profile/Kai-Cui-4/publication/327282708_Decoder_Side_Image_Quality_Enhancement_exploiting_Inter-channel_Correlation_in_a_3-Stage_Submission_to_CLIC_2018.
(Continued)

*Primary Examiner* — Jose L Couso
(74) *Attorney, Agent, or Firm* — Moore IP

(57) ABSTRACT

A device includes a memory configured to store an adapted network that is configured to generate a modified image based on a single image. The device includes a processor configured to obtain, from a stream of video data, a first distorted image depicting an object, and to provide the first distorted image to the adapted network to generate a first modified image. The processor is configured to obtain, from the stream of video data, a second distorted image depicting the object, and to provide the second distorted image to the adapted network to generate a second modified image. The object is distorted differently in the second distorted image than in the first distorted image. The processor is configured to generate a video output including the first modified image and the second modified image without visible artifacts due to distortion differences between the first distorted image and the second distorted image.

39 Claims, 11 Drawing Sheets

(58) Field of Classification Search
CPC ......... G06T 2207/20084; G06T 3/4046; G06T 3/4053; G06T 5/005; G06T 2207/20192; G06T 2207/20208; G06T 5/009; G06T 2207/20182; G06V 20/49; G06V 10/30; G06V 10/454; G06V 10/764; H04N 19/186; H04N 19/86; H04N 19/117; H04N 19/137; H04N 19/14; H04N 19/176; H04N 19/182; H04N 19/85; G06K 9/627

See application file for complete search history.

(56) References Cited

U.S. PATENT DOCUMENTS

| | | | | |
|---|---|---|---|---|
| 2015/0092089 | A1* | 4/2015 | Vitsnudel | H04N 5/2258 348/241 |
| 2015/0245043 | A1* | 8/2015 | Greenebaum | H04N 19/177 375/240.25 |
| 2015/0264298 | A1* | 9/2015 | Colenbrander | H04N 7/013 345/547 |
| 2017/0278225 | A1* | 9/2017 | Nishimura | G06T 5/002 |
| 2018/0343448 | A1* | 11/2018 | Possos | H04N 19/176 |
| 2019/0281310 | A1 | 9/2019 | Lee et al. | |
| 2020/0084460 | A1* | 3/2020 | Li | H04N 19/14 |
| 2020/0389672 | A1* | 12/2020 | Kennett | G06T 3/4046 |
| 2020/0396398 | A1* | 12/2020 | Romanenko | G06K 9/0051 |
| 2022/0215511 | A1* | 7/2022 | Zafar | G06T 5/20 |

OTHER PUBLICATIONS

Gopan K., et al., "Video Super Resolution with Generative Adversarial Network", 2018 2nd International Conference on Trends in Electronics and Informatics (ICOEI), IEEE, May 11, 2018 (May 11, 2018), pp. 1489-1493, XP033460445, DOI: 10.1109/ICOEI.2018.8553719 [retrieved on Nov. 29, 2018] the whole document.

International Search Report and Written Opinion—PCT/US2021/071866—ISA/EPO—dated Jan. 20, 2022.

Jo Y., et al., "Deep Video Super-Resolution Network Using Dynamic Upsampling Filters without Explicit Motion Compensation", 2018 IEEE/CVF Conference on Computer Vision and Pattern Recognition, IEEE, Jun. 18, 2018 (Jun. 18, 2018), pp. 3224-3232, XP033476291, DOI: 10.1109/CVPR.2018.00340 [retrieved on Dec. 14, 2018] p. 3224-p. 3228.

Park D., et al., "Multi-Temporal Recurrent Neural Networks for Progressive Non-Uniform Single Image Deblurring with Incremental Temporal Training", Aug. 28, 2020 (Aug. 28, 2020), Computer Vision—ECCV 2020: 16th European Conference, Glasgow, UK, Aug. 23-28, 2020 : Proceedings, Part of the Lecture Notes in Computer Science, ISSN0302-9743, [Lecture Notes in Computerscience; Lect.Notes Computer], pp. 327-343, XP047590897, ISBN: 978-3-030-58594-5 the whole document.

Soh J.W, et al., "Reduction of Video Compression Artifacts Based on Deep Temporal Networks", IEEE Access, vol. 6, Jun. 23, 2018 (Jun. 23, 2018), pp. 63094-63106, XP011704852, DOI: 10.1109/ACCESS.2018.2876864 [retrieved on Nov. 13, 2018] p. 63094-p. 63097.

Yu S., et al., "HEVC Compression Artifact Reduction with Generative Adversarial Networks", 2019 11th International Conference on Wireless Communications and Signal Processing (WCSP), IEEE, Oct. 23, 2019 (Oct. 23, 2019), 6 Pages, XP033671727, DOI: 10.1109/WCSP.2019.8927915[retrieved on Dec. 6, 2019] the Whole Document.

Ledig et al., "Photo-Realistic Single Image Super-Resolution Using a Generative Adversarial Network", https://arxiv.org/abs/1609.04802, May 25, 2017, pp. 1-19.

Liu et al., "End-to-End Trainable Video Super-Resolution Based on a New Mechanism for Implicit Motion Estimation and Compensation", Computer Vision Foundation, 2020, http://openaccess.thecvf.com/content_WACV_2020/papers/Liu_End-To-End_Trainable_Video_Super-Resolution_Based_on_a_New_Mechanism_for_WACV_2020_paper.pdf pp. 2416-2425.

He et al., "Deep Residual Learning for Image Recognition", Dec. 10, 2015, pp. 1-12.

"Chroma subsampling", https://en.wikipedia.org/wiki/Chroma_subsampling, printed Oct. 2, 2020, pp. 1-7.

"Image scaling", https://en.wikipedia.org/wiki/Image_scaling, printed Oct. 2, 2020, pp. 1-5.

"Neural style transfer", https://www.tensorflow.org/tutorials/generative/style_transfer, printed Oct. 2, 2020, pp. 1-18.

* cited by examiner

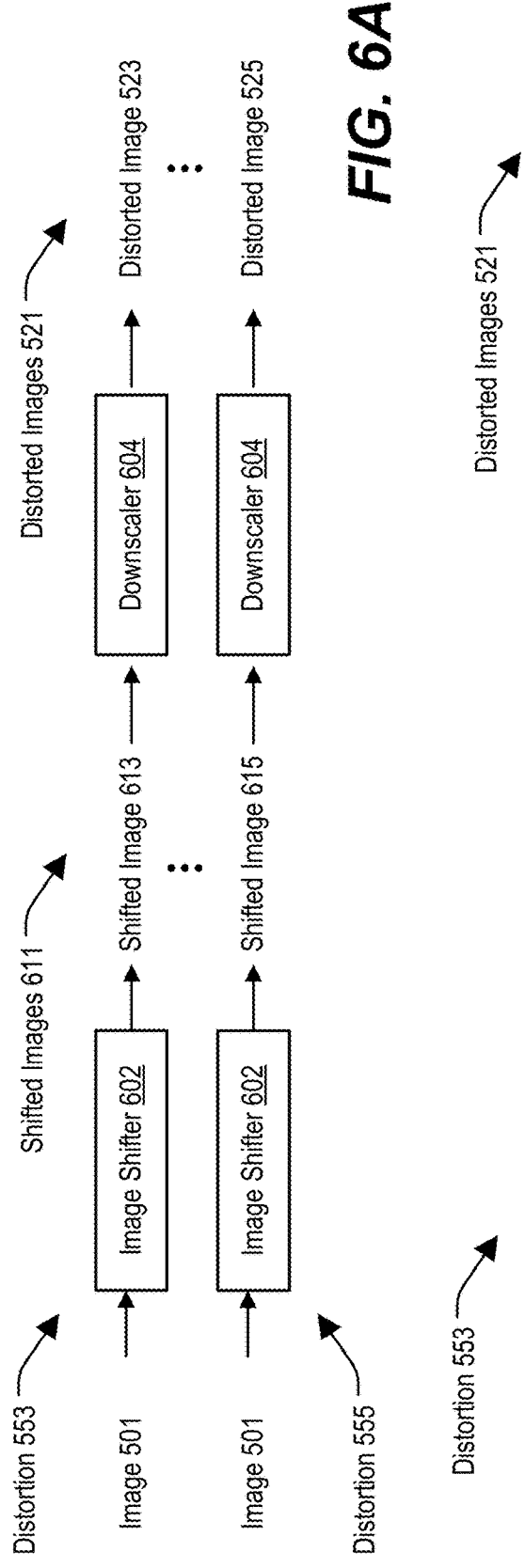
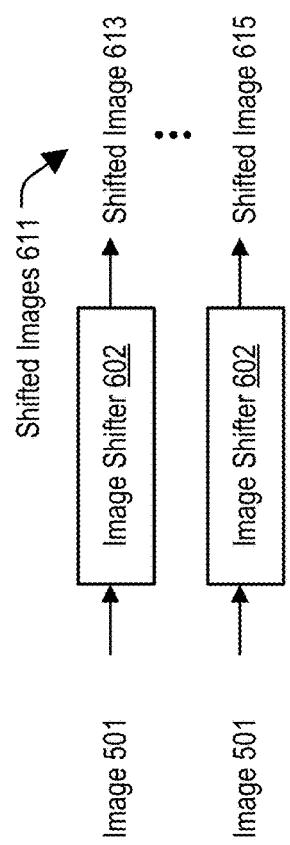
FIG. 6A
FIG. 6B

SYSTEM AND METHOD TO PROCESS IMAGES OF A VIDEO STREAM

I. FIELD

The present disclosure is generally related to processing images of a video stream.

II. Description of Related Art

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Computing devices are commonly used to stream video content. To save bandwidth and reduce storage requirements, video content is often downscaled and compressed to a smaller file format for streaming. A device that receives the streamed content typically upscales the received content for viewing. The upscaled content has lower video quality relative to the original video content.

III. SUMMARY

In a particular aspect, a device configured to process images of a stream of video data is disclosed. The device includes a memory and a processor. The memory is configured to store an adapted network that is configured to generate a modified image based on a single input image. The processor is configured to obtain, from a stream of video data, a first distorted image depicting an object. The processor is also configured to provide the first distorted image as input to the adapted network to generate a first modified image. The processor is further configured to obtain, from the stream of video data, a second distorted image depicting the object. The object is distorted differently in the second distorted image than in the first distorted image. The processor is also configured to provide the second distorted image as input to the adapted network to generate a second modified image. The processor is further configured to generate a video output including the first modified image and the second modified image without visible artifacts due to distortion differences between the first distorted image and the second distorted image.

In another particular aspect, a device configured to process images of a stream of video data is disclosed. The device includes a memory and a processor. The memory is configured to store an adapted network that is configured to generate a modified image based on a single input image. The adapted network is trained using at least one batch of training image pairs. A plurality of image pairs of the batch of training image pairs is based on a first image. A first particular image pair of the batch of training image pairs includes a first particular target image and a first particular distorted image. A second particular image pair of the batch of training image pairs includes a second particular target image and a second particular distorted image. Each of the first particular target image and the second particular target image is based on the first image. The first particular distorted image is based on applying a first distortion to the first image. The second particular distorted image is based on applying a second distortion, that is distinct from the first distortion, to the first image. The processor is configured to obtain, from a stream of video data, a first distorted image depicting an object. The processor is also configured to provide the first distorted image as input to the adapted network to generate a first modified image. The processor is further configured to obtain, from the stream of video data, a second distorted image depicting the object. The object is distorted differently in the second distorted image than in the first distorted image. The processor is also configured to provide the second distorted image as input to the adapted network to generate a second modified image. The processor is further configured to generate a video output including the first modified image and the second modified image without visible artifacts due to distortion differences between the first distorted image and the second distorted image.

In another particular aspect, a method of processing images of a stream of video data is disclosed. The method includes obtaining, from a stream of video data, first image data representing a first distorted image depicting an object. The first image data corresponds to multiple channels. The method also includes providing the first image data as input to an adapted network to generate first modified image data. The first modified image data corresponds to fewer channels than the first image data. The method further includes generating first output image data based at least in part on the first modified image data. The method also includes generating a video output based on the first output image data.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 6A is a diagram of examples of distortions performed by the system of FIG. 5, in accordance with some examples of the present disclosure;

FIG. 6B is a diagram of examples of distortions performed by the system of FIG. 5, in accordance with some examples of the present disclosure;

V. DETAILED DESCRIPTION

Systems and methods to process images of a video stream are disclosed. A received video stream can include distortions caused by one or more processing operations, such as downscaling, compression, decompression, upscaling, etc. Multi-image processing of images of the video content can have delays associated with processing multiple images to output each processed image. In multi-image processing, images of the video stream cannot be processed in parallel as processing of a subsequent image depends on previous images having been processed. Single-image processing can result in distortion differences between processed images that are visible to a viewer as temporal flicker, jitters, or jumps. According to techniques described herein, a device includes an adapted network that is configured to generate a modified image based on a single input image. The adapted network is trained to produce modified images that match (e.g., approximate) the same image for input images with various distortions so that the distortion differences are reduced between the modified images. For example, the adapted network is trained to process an input image to generate a modified image such that the modified image has reduced distortions relative to the input image and also has reduced distortion differences with other modified images corresponding to preceding or subsequent images in a video stream. The adapted network thus enables generation of video output with reduced temporal flicker, jitters, or jumps by using single-image processing that is faster and more computationally efficient than multi-image processing.

Figure 1:
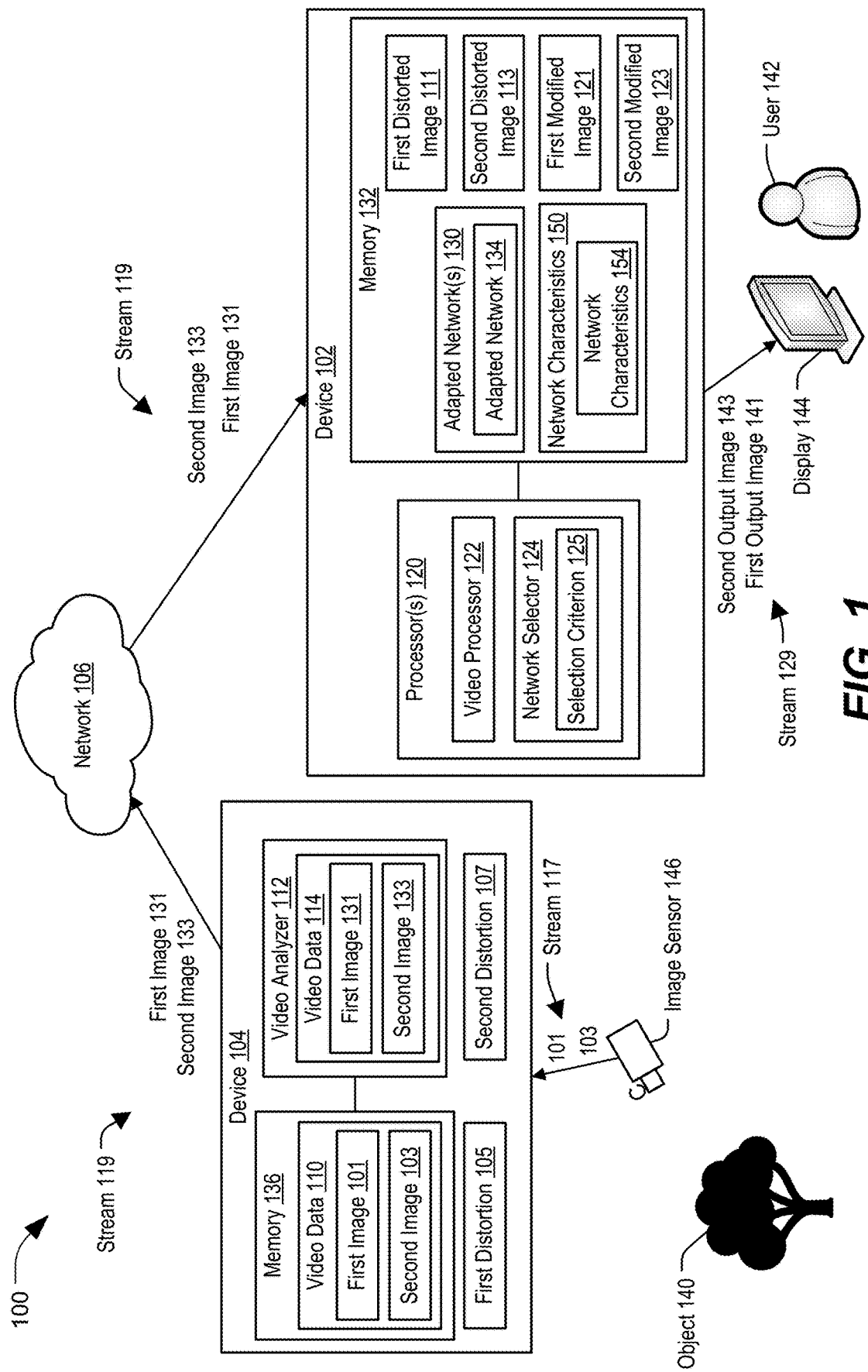
FIG. 1 is a block diagram of a particular illustrative aspect of a system operable to process images of a video stream, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 120 in FIG. 1), which indicates that in some implementations the device 102 includes a single processor 120 and in other implementations the device 102 includes multiple processors 120. For ease of reference herein, such features are generally introduced as "one or more" features, and are subsequently referred to in the singular unless aspects related to multiple of the features are being described.

It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system operable to process images of a video stream is disclosed and generally designated 100. The system 100 includes a device 102 coupled via a network 106 to a device 104. The network 106 includes a wired network, a wireless network, or both. In a particular aspect, the network 106 includes a cellular network, a satellite network, a peer-to-peer network, a Wi-Fi network, or a combination thereof.

The device 104 includes a memory 136 coupled to a video analyzer 112. The device 104 is coupled to an image sensor 146 (e.g., a video camera). In a particular aspect, the image sensor 146 is external to the device 104. In an alternative aspect, the image sensor 146 is integrated into the device 104. The image sensor 146 is configured to generate a stream 117 of images captured by the image sensor 146. The memory 136 is configured to store video data 110 corresponding to the images. The video analyzer 112 is configured to output distorted images corresponding to the images as a stream 119 of video data. In some aspects, the distortions are caused at least partially by the video analyzer 112, e.g., by downscaling the images for transmission, resulting in generation of the distorted images. In some aspects, the distortions are caused at least partially by external factors, such as jitter caused by movement of an object captured in the images or movement (e.g., due to hand jitter) of the image sensor 146.

The device 102 includes a memory 132 coupled to one or more processors 120. The device 102 is coupled to a display device 144. In a particular aspect, the display device 144 is external to the device 102. In alternative aspect, the display device 144 is integrated into the device 102.

The memory 132 is configured to store one or more adapted networks 130 that are each configured to generate a modified image based on a single input image. For example, each of the one or more adapted networks 130 is configured to generate reduce (e.g., remove) distortions in the modified image relative to the input image (e.g., a distorted image). Examples of adapted networks configured to reduce various distortions are further described with reference to FIGS. 3A-3E and 4. Training of an adapted network 134 of the one or more adapted networks 130 is further described with reference to FIGS. 5-6. In a particular aspect, the adapted network 134 includes a convolutional neural network (CNN), a multi-layer perceptron (MLP) neural network, or a recurrent neural network (RNN).

In a particular aspect, the one or more adapted networks 130 include a single adapted network (e.g., the adapted network 134). In an alternative aspect, the one or more adapted networks 130 include a plurality of adapted networks. In this aspect, the one or more processors 120 include a network selector 124 that is configured to select an adapted network (e.g., the adapted network 134) from the plurality of adapted networks based on a selection criterion 125 and network characteristics 150 of the plurality of adapted networks. In a particular example, the selection criterion 125 is based on a particular user, a particular location, a particular event, a particular purpose, or a combination thereof. In a particular example, the network selector 124 determines the selection criterion 125 based on a user input, a sensor input, default data, a configuration setting, or a combination thereof. The network selector 124 selects the adapted network 134 from the one or more adapted networks 130 in response to determining that network characteristics 154 of the adapted network 134 satisfy the selection criterion 125.

The one or more processors 120 include a video processor 122. The video processor 122 is configured to provide an image (e.g., a distorted image) of a video stream as input to the adapted network 134 (e.g., a selected adapted network) to generate a modified image, as further described with reference to FIG. 2. The video processor 122 is configured to generate output images based on modified images, as further described with reference to FIG. 2, and output the output images as a stream 129 to the display device 144.

During operation, the memory 136 stores video data 110 including images of a video. For example, the video data 110 includes a first image 101, a second image 103, one or more additional images, or a combination thereof. In a particular aspect, the video data 110 is based on the stream 117 of images captured by the image sensor 146. In another aspect, the video data 110 is retrieved from a storage device. In a particular aspect, the video data 110 is generated by a video generation application (e.g., an animation application, a gaming application, or both). In a particular aspect, the video data 110 includes images of an object 140 (e.g., a tree). To further illustrate, the first image 101 depicts the object 140 and the second image 103 depicts the object 140, and at least a portion of the object 140 is in a different location relative to the image sensor 146 in the second image 103 as compared to the first image 101. For example, the difference in relative location is based on a movement of at least the portion of the object 140, a movement of the image sensor 146, or both.

The video analyzer 112 generates video data 114 based on the video data 110. For example, the video data 114 includes a first image 131 and a second image 133 corresponding to the first image 101 and the second image 103, respectively. In a particular aspect, the video analyzer 112 generates the first image 131 and the second image 103 by downscaling, compressing, or both, the first image 101 and the second image 103, respectively. The video analyzer 112 outputs a stream 119 based on the video data 114. For example, the stream 119 includes (e.g., contains data representing) the first image 131, the second image 133, one or more additional images, or a combination thereof. In a particular aspect, the video analyzer 112 outputs the stream 119 in real-time as the stream 117 is being received from the image sensor 146.

The device 102 receives the stream 119 via the network 106 from the device 104. For example, a user 142 selects an option (e.g., a play video option) displayed by the display device 144 to initiate receipt of a video that is sent by the device 104 as the stream 119. The device 102 includes one or more components, such as a network adapter or a receiver (not shown), that receives the stream 119 via the network 106 from the device 104.

The video processor 122 generates a plurality of images (e.g., distorted images) corresponding to the stream 119. For example, the video processor 122 generates a first distorted image 111 and a second distorted image 113 based on the first image 131 and the second image 133, respectively, of the stream 119. In a particular aspect, the distorted images include (e.g., are the same as) the images received in the stream 119. For example, the first distorted image 111 includes the first image 131. In an alternative aspect, the video processor 122 processes (e.g., decompresses, upscales, or both) the images received in the stream 119 to generate the distorted images. For example, the video processor 122 generates the first distorted image 111 by decompressing, upscaling, or both, the first image 131.

The distorted images can correspond to various distortions. The first distorted image 111 corresponds to (e.g., includes) a first distortion 105 and the second distorted image 113 corresponds to (e.g., includes) a second distortion 107. In a particular aspect, the distortions include movement distortions caused by movement of the object 140, movement of the image sensor 146, or both. For example, the first image 101 includes a first movement distortion (e.g., a motion blur) caused at a first time by a first movement of the object 140, a first movement of the image sensor 146, or both. In a particular aspect, the first distortion 105 includes movement distortions corresponding to the first movement distortion. As another example, the second image 103 includes a second movement distortion caused at a second time (e.g., a later time than the first time) by a second movement of the object 140, a second movement of the image sensor 146, or both. In a particular aspect, the second distortion 107 includes movement distortions corresponding to the second movement distortion.

In a particular aspect, the distortions include analyzer distortions caused by processing by the video analyzer 112, the video processor 122, or both. For example, the video analyzer 112 generates the first image 131 by processing (e.g., downscaling, compressing, or both) the first image 101. To illustrate, the video analyzer 112 downscales the first image 101 to generate a downscaled image and generates the first image 131 (e.g., a compressed image) by compressing the downscaled image. The first image 131 includes a first analyzer distortion caused by the processing performed by the video analyzer 112. The video processor 122 generates the first distorted image 111 by processing (e.g., decompressing, upscaling, or both) the first image 131. For example, the video processor 122 generates a decompressed image by decompressing the first image 131 and generates the first distorted image 111 (e.g., an upscaled image) by upscaling the decompressed image. The first distortion 105 includes analyzer distortions corresponding to the first analyzer distortion caused by the processing performed by the video analyzer 112, a second analyzer distortion caused by the processing performed by the video processor 122, or both. For example, the first distortion 105 includes compression artifacts, scaling artifacts, or a combination thereof.

In a particular aspect, the first distorted image 111 includes a first depiction of the object 140 and the second distorted image 113 includes a second depiction of the object 140. The object 140 is distorted differently in the second distorted image 113 than in the first distorted image 111. In a particular aspect, the distortion differences are based on spatial aliasing differences between the first distorted image 111 and the second distorted image 113, downscaling aliasing artifacts caused by a sub-pixel shift between the second depiction relative to the first depiction, compression artifacts caused by compression used to generate the first distorted image 111 and the second distorted image 113, hand jitter between capturing the first image 101 and the second image 103, movement of the object 140 between capturing the first image 101 and the second image 103, movement of the image sensor 146 between capturing the first image 101 and the second image 103, or a combination thereof. In a particular example, if there is no relative change (e.g., motion) in the first depiction of the object 140 in the first distorted image 111 and the second depiction of the object 140 in the second distorted image 113 or the change between the first depiction and the second depiction is represented as an integer shift of pixel values, downscaling artifacts look the same in the first distorted image 111 and the second distorted image 113. If there is sub-pixel change (e.g., motion) between the first depiction and the second depiction, different downscaling artifacts are visible in the first distorted image 111 and the second distorted image 113.

In a particular aspect, the one or more adapted networks 130 include a set of adapted networks and the network selector 124 selects the adapted network 134 from the set of adapted networks based on the selection criterion 125. The selection criterion 125 is based on default data, a configuration setting, a user input, a sensor input, or a combination thereof. In a particular aspect, the memory 132 stores network characteristics 150 of the set of adapted networks and the network selector 124 selects the adapted network 134 in response to determining that network characteristics 154 of the adapted network 134 satisfy the selection criterion 125. For example, the network characteristics 154 indicate that the adapted network 134 is trained for a particular user, a particular location, a particular purpose, a particular event, or a combination thereof, as further described with reference to FIG. 5. The network selector 124 determines that the network characteristics 154 satisfy the selection criterion 125 in response to determining that the particular user matches the user 142 (e.g., a logged-in user) of the device 102, that the particular location matches a location of the device 102, that the particular purpose matches a purpose of receiving the stream 119 (e.g., indicated by user input, a calendar appointment, or a streaming application), that the particular event matches an event associated with receiving the stream 119 (e.g., indicated by user input, a calendar appointment, or a streaming application), or a combination thereof.

The video processor 122 provides the distorted images corresponding to the stream 119 as a sequence of input images to the adapted network 134 (e.g., the selected network) in response to determining that the network characteristics 154 satisfy the selection criterion 125. In an alternative aspect, the one or more adapted networks 130 include a single adapted network (e.g., the adapted network 134) and the video processor 122 provides the distorted images corresponding to the stream 119 as input to the adapted network 134 independently of the network characteristics 154 and the selection criterion 125.

The video processor 122 provides the distorted images corresponding to the stream 119 as input to the adapted network 134 to generate modified images, as further described with reference to FIG. 2. For example, the video processor 122 provides the first distorted image 111 to the adapted network 134 to generate a first modified image 121. Similarly, the video processor 122 provides the second distorted image 113 to the adapted network 134 to generate a second modified image 123. The adapted network 134 is trained to generate the modified images such that distortion differences between the modified images are reduced (e.g., removed). The adapted network 134 generates each of the modified images based on a single input image and independently of data from other images. For example, the adapted network 134 generates the first modified image 121 based on the first distorted image 111 and independently of other images (e.g., the second distorted image 113) corresponding to the stream 119. Similarly, the adapted network 134 generates the second modified image 123 based on the second distorted image 113 and independently of other images (e.g., the first distorted image 111) corresponding to the stream 119.

The video processor 122 generates a video output based on the modified images, as further described with reference to FIG. 2. For example, the video processor 122 generates a video output including a first output image 141 that is based at least in part on the first modified image 121. As another example, the video processor 122 generates the video output including a second output image 143 that is based at least in part on the second modified image 123. The video output is without visible artifacts due to distortion differences between the distorted images.

For example, the video processor 122 provides the video output as a stream 129 to the display device 144. To illustrate, the video processor 122 provides the first output image 141, the second output image 143, one or more additional output images, or a combination thereof, to the display device 144. The display device 144 displays the video output to the user 142 without visible artifacts (e.g., temporal flicker, jitter, or jumps) due to distortion differences between the distorted images.

In a particular aspect, the video processor 122 generates modified images in real-time as the stream 119 is being received and provides the video output based on the modified images as the stream 129 to the display device 144. For example, the video processor 122 provides the stream 129 to the display device 144 in real-time as the stream 119 is being received from the device 104.

A received video stream often includes distortions due to information loss caused by downsampling, upsampling, compression, decompression, downscaling, upscaling, etc. Artificial intelligence can be used to reduce distortion artifacts by adding detail that approximates the lost information. Using a generally trained network to perform single-image processing to reduce the distortion causes temporal flicker, jitter, or jumps between the processed images that are visible to a viewer. Multi-image processing can include delays associated with waiting to receive multiple images before processing a particular image of the video stream, computational complexity associated with processing multiple images to generate each processed image, etc.

The system 100 enables an efficient reduction of visible artifacts in video output by generating each modified image based on a single corresponding input image. For example, as a modified image can be generated as soon as an input image is available without delay associated with waiting for additional images. Processing a single input image to generate the modified image can use fewer computing cycle and take less time than processing multiple images. The adapted network 134 is trained to generate modified images that correspond to the same image for input images corresponding to various distortions, as further described with reference to FIG. 5. The adapted network 134 thus enables single image-processing to generate modified images with reduced distortion differences between the modified images so that the stream 129 includes reduced (e.g., no) visible temporal flicker, jumps, or jitters.

Although FIG. 1 illustrates particular examples for clarity of explanation, such examples are not to be considered as limitations. For example, in some aspects, the video processor 122 uses the adapted network 134 to generate modified images based on video data (e.g., distorted images of the video data 114) retrieved from a storage device instead of a stream received from another device. In another example, the image sensor 146 is coupled to the device 102 and the video processor 122 generates the modified images based on the stream 117 received from the image sensor 146 (e.g., a local image sensor) instead of a stream received from another device. In a particular aspect, the video processor 122 generates the modified images based on a stream of distorted images received from a local application (e.g., a video gaming application). In a particular aspect, the video processor 122 stores the video output in a storage device, provides the video output to another device, or both.

Figure 2:
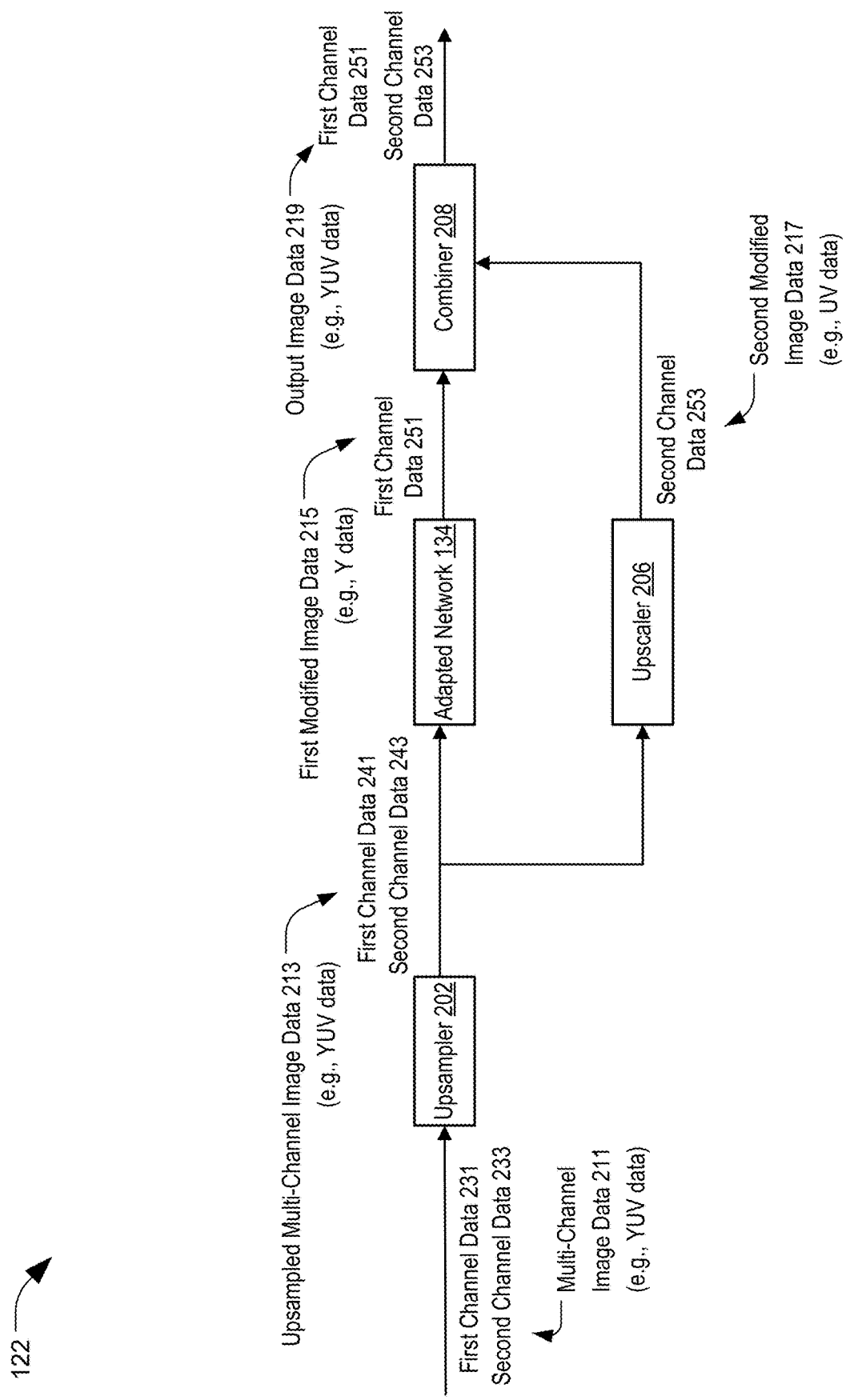
FIG. 2 is a diagram of an example of a video processor of the system of FIG. 1, in accordance with some examples of the present disclosure.

Referring to FIG. 2, an example of illustrative components and data flow of the video processor 122 is shown in accordance with a particular implementation. The video processor 122 includes an upsampler 202 coupled via the adapted network 134 and an upscaler 206 to a combiner 208.

The upsampler 202 receives multi-channel image data 211 corresponding to a distorted image. In a particular example, the multi-channel image data 211 includes the first distorted image 111. In another particular example, the multi-channel image data 211 includes the second distorted image 113. Each of the distorted images includes image data corresponding to multiple channels (e.g., a luma channel, one or more chrominance channels, or a combination thereof). For example, the multiple channels correspond to a YUV color encoding format, a RGB color encoding format, or another color encoding format. The multi-channel image data 211 includes first channel data 231 corresponding to one or more first channels (e.g., Y channel or luma channel) and second channel data 233 corresponding to one or more second channels (e.g., UV channels or chrominance channels).

As used herein, "image data corresponding to a particular channel" refers to a set of pixel values for each pixel of an image, such that the set of pixel values includes a particular pixel value indicating channel information of the pixel for the particular channel. For example, the multi-channel image data 211 includes a first set of pixel values of a first pixel of a distorted image, a second set of pixel values of a second pixel of the distorted image, and additional sets of pixel values of additional pixels of the distorted image. The first set of pixel values (e.g., 0.5, 0.2, 0.6) includes a first channel pixel value (e.g., 0.5) indicating first channel information (e.g., brightness) of the first pixel for a first channel (e.g., a luma channel or a Y channel), a second channel pixel value (e.g., 0.2) indicating second channel information (e.g., blue projection) of the first pixel for a second channel (e.g., a chrominance channel or U channel), additional channel pixel values (e.g., 0.6) indicating additional channel information (e.g., red projection) of the first pixel for additional channels (e.g., a chrominance channel or V channel), or a combination thereof.

The upsampler 202 generates upsampled multi-channel image data 213 by upsampling the multi-channel image data 211. For example, the upsampler 202 performs a format conversion operation on the multi-channel image data 211 having a first format (e.g., YUV 420 format) to generate the upsampled multi-channel image data 213 having a second format (e.g., YUV 444 format). The second format has a higher resolution than the first format. The upsampled multi-channel image data 213 includes first channel data 241 corresponding to the one or more first channels (e.g., Y channel or luma channel) and second channel data 243 corresponding to the one or more second channels (e.g., UV channels or chrominance channels).

In a particular aspect, the upsampling performed by the upsampler 202 mirrors a downsampling (e.g., a chroma subsampling) performed by the video analyzer 112 of FIG. 1. For example, the video analyzer 112 generates the first image 131 by downsampling the first image 101 (or a downscaled version of the first image 101). In a particular aspect, the upsampled multi-channel image data 213 has lower quality as compared to the first image 101 (or the downscaled version of the first image 101) due to information loss between downsampling and upsampling. In a particular aspect, the video analyzer 112 performs the downsampling to compress the first image 101 (or the downscaled version of the first image 101) to generate the multi-channel image data 211 for transmission via the network 106 and the upsampler 202 performs the upsampling to decompress the multi-channel image data 211. In a particular aspect, the first distorted image 111 of FIG. 1 includes the upsampled multi-channel image data 213. In an alternative aspect, the second distorted image 113 of FIG. 1 includes the upsampled multi-channel image data 213.

The upsampler 202 provides the upsampled multi-channel image data 213 as input to each of the adapted network 134 and the upscaler 206. The adapted network 134 generates first modified image data 215 based on the upsampled multi-channel image data 213, as further described with reference to FIGS. 3-4. In a particular aspect, the upsampled multi-channel image data 213 corresponds to more channels (e.g., a greater count of channels) as compared to the first modified image data 215. For example, the upsampled multi-channel image data 213 includes the first channel data 241 corresponding to the one or more first channels (e.g., a luma channel) and the second channel data 243 corresponding to the one or more second channels (e.g., one or more chrominance channels), and the first modified image data 215 includes first channel data 251 corresponding to the one or more first channels (e.g., the luma channel) and is independent of the one or more second channels (e.g., the chrominance channels). To illustrate, the first modified image data 215 includes information (e.g., the first channel data 251) corresponding to the first channels (e.g., the luma channel) and omits information corresponding to the second channels (e.g., the chrominance channels).

As used herein, "image data independent of a particular channel" refers to a set of pixel values for each pixel of an image, such that the set of pixel values omits a pixel value indicating channel information of the pixel for the particular channel. In a particular aspect, the first modified image data 215 includes a first set of pixel values of a first pixel of a modified image, a second set of pixel values of a second pixel of the modified image, and additional sets of pixel values of additional pixels of the modified image. The first set of pixel values (e.g., 0.6) includes a first channel pixel value (e.g., 0.6) indicating first channel information (e.g., brightness) of the first pixel for a first channel (e.g., a luma channel or a Y channel). The first set of pixel values omits a second channel pixel value indicating second channel information (e.g., blue projection) of the first pixel for a second channel (e.g., a chrominance channel or U channel), additional channel pixel values indicating additional channel information (e.g., red projection) of the first pixel for additional channels (e.g., a chrominance channel or V channel), or a combination thereof.

In a particular aspect, a particular pixel of the multi-channel image data 211 (e.g., the first channel data 231) is represented by a first pixel value (e.g., 0.5) corresponding to a first channel (e.g., a luma channel). A second pixel of the first modified image data 215 (e.g., the first channel data 251) is represented by a second pixel value (e.g., 0.6) corresponding to the first channel (e.g., the luma channel). The second pixel value is modified relative to the first pixel value. For example, the adapted network 134 determines the second pixel value based on the first pixel value and the second pixel value is distinct from the first pixel value.

As described, the upsampled multi-channel image data 213 includes the first channel data 241 corresponding to the one or more first channels (e.g., the luma channel) and the second channel data 243 corresponding to the one or more second channels (e.g., one or more chrominance channels). In a particular aspect, although the first modified image data 215 corresponds to the first channels (e.g., includes the first channel data 251) and does not correspond to the second channels, generating the first modified image data 215 based on the first channel data 241 and the second channel data 243 can lead to greater reduction in distortions (e.g., distortion differences between modified images) as compared to generating the first modified image data 215 based only on the first channel data 241 and independently of the second channel data 243. For example, although the first modified image data 215 can be generated based only on the first channel data 241 and independently of the second channel data 243, generating the first modified image data 215 based on the second channel data 243 in addition to the first channel data 241 can lead to greater reduction in distortions because of the additional relevant information or context provided by the second channel data 243 (e.g., color information that improves detection of different types of surfaces, materials, etc.).

The upscaler 206 generates second modified image data 217 based on the upsampled multi-channel image data 213 and independently of the adapted network 134. The second modified image data 217 includes second channel data 253 corresponding to the one or more second channels (e.g., the chrominance channels) and is independent of the one or more first channels (e.g., the luma channel). For example, the second modified image data 217 includes information (e.g., the second channel data 253) corresponding to the one or more second channels (e.g., chrominance information) and omits information corresponding to the first channels (e.g., luma information). In a particular aspect, the upscaler 206 generates the second modified image data 217 based on the second channel data 243 and independently of the first channel data 241. The upscaler 206 upscales the second channel data 243 from a first resolution to generate the second modified image data 217 (e.g., the second channel data 253) having a second resolution that is greater than the first resolution. For example, the second modified image data 217 (e.g., the second channel data 253) includes a higher count of pixels as compared to the second channel data 243.

In a particular aspect, the upscaling performed by the upscaler 206 mirrors a downscaling performed by the video analyzer 112 of FIG. 1. For example, the video analyzer 112 generates the first image 131 by downscaling the first image 101 (or downsampling a downscaled version of the first image 101). In a particular aspect, the second modified image data 217 has lower quality as compared to the first image 101 due to information loss between downscaling and upscaling. In a particular aspect, the video analyzer 112 applies an anti-aliasing filter to the first image 101 prior to performing the downscaling and the upscaler 206 applies a reconstruction filter after upscaling the second channel data. In a particular aspect, the upscaler 206 uses various algorithms to generate the second modified image data 217, such as nearest-neighbor interpolation, bilinear and bicubic algorithms, Sinc and Lanczos resampling, Box sampling, mipmap, fourier transform methods, edge-directed interpolation, hqx, vectorization, machine learning, deep convolutional neural networks, or a combination thereof.

The combiner 208 generates output image data 219 (e.g., a modified image) by combining the first modified image data 215 (e.g., the first channel data 251) corresponding to the one or more first channels (e.g., luma channel) with the second modified image data 217 (e.g., the second channel data 253) corresponding to the one or more second channels (e.g., chrominance channels). The output image data 219 has higher resolution than the multi-channel image data 211 (e.g., the multi-channel image data 211 has a first resolution that is lower than a second resolution of the output image data 219). In a particular aspect, the output image data 219 corresponds to the first output image 141 of FIG. 1. In an alternative aspect, the output image data 219 corresponds to the second output image 143 of FIG. 1.

The video processor 122 thus enables generation of the first modified image data 215 (e.g., the first channel data 251) corresponding to the first channels (e.g., the luma channel) using the adapted network 134 and generation of the second modified image data 217 (e.g., the second channel data 253) corresponding to the second channels (e.g., the chrominance channels) independently of the adapted network 134. In some aspects, using the upscaler 206 to generate the second modified image data 217 (e.g., the second channel data 253) independently of the adapted network 134 reduces complexity and is faster as compared to generating the second modified image data 217 using an adapted network. In a particular aspect, having the adapted network 134 process the second channel data 243 corresponding to the second channels (e.g., the chrominance channels) in addition to the first channel data 241 corresponding to the first channels (e.g., the luma channel) to generate the first modified image data 215 (e.g., the first channel data 251) corresponding to the first channels enables a greater reduction in distortion differences. In other implementations, the adapted network 134 generates the first modified image data 215 (e.g., the first channel data 251) based on the first channel data 241 corresponding to the first channels (e.g., luma channel) and independently of the second channel data 243 corresponding to the second channels (e.g., the chrominance channels). Having the adapted network 134 generate the first modified image data 215 based on data corresponding to a single distorted image and independently of data corresponding to other distorted images reduces complexity and is faster than using an adapted network that generates modified data based on multiple input images.

The first channels and the second channels including a luma channel (e.g., a Y channel) and chrominance channels (e.g., UV channels), respectively, is provided as an illustrative example. In other examples, the first channels and the second channels can include any sets of channels. In an illustrative example, the first channels include first chrominance channels (e.g., RG channels) and the second channels include second chrominance channels (e.g., B channel). In this example, the multi-channel image data 211 includes the first channel data 231 representing at least first color information (e.g., one or more first chrominance channels) and the second channel data 233 representing second color information (e.g., one or more second chrominance channels), and the first modified image data 215 includes the first channel data 251 representing the first color information (e.g., the first chrominance channels) and omits the second color information (e.g., the second chrominance channels).

In a particular implementation, the upsampler 202 is optional. For example, the adapted network 134 receives the multi-channel image data 211 and performs the upscaling of the first channel data 231 (e.g., the low resolution luma channel) and upscaling of the second channel data 233 (e.g., the low resolution chrominance channels) to generate the first modified data 215. In another example, the adapted network 134 upscales the first channel data 231 (e.g., low resolution luma channel) and receives the second channel data 243 (e.g., upsampled chrominance channels) from the upsampler 202 to generate the first modified data 215. In a particular aspect, the input to the adapted network 134 corresponds to more channels (e.g., a greater count of channels) as compared to the output of the adapted network 134 (e.g., the first modified image data 215).

Figure 3B:
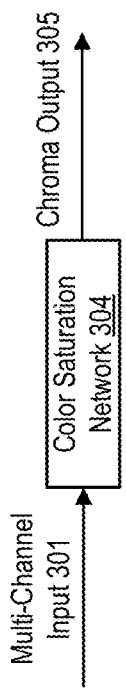
FIG. 3B is a diagram of an example of a color saturation network, in accordance with some examples of the present disclosure.
Figure 3D:
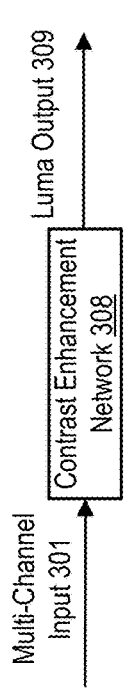
FIG. 3D is a diagram of an example of a contrast enhancement network, in accordance with some examples of the present disclosure.
Figure 3E:
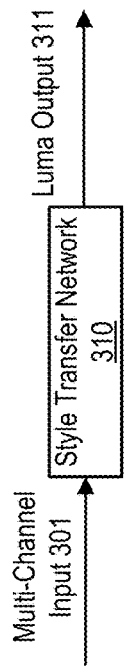
FIG. 3E is a diagram of an example of a style transfer network, in accordance with some examples of the present disclosure.
Figure 3A:
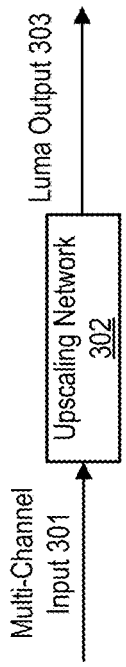
FIG. 3A is a diagram of an example of an upscaling network, in accordance with some examples of the present disclosure.
Figure 3C:
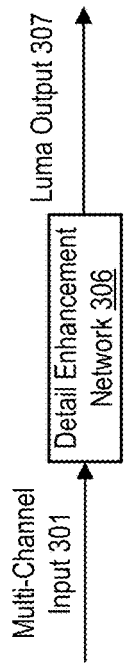
FIG. 3C is a diagram of an example of a detail enhancement network, in accordance with some examples of the present disclosure.

In FIG. 3A-3E, examples of adapted networks are shown. FIG. 3A includes an upscaling network. FIG. 3B includes a color saturation network. FIG. 3C includes a detail enhancement network. FIG. 3D includes a contrast enhancement network. FIG. 3E includes a style transfer network.

Referring to FIG. 3A, an upscaling network 302 is shown that, in some implementations, is included in the adapted network 134 of FIG. 1. The upscaling network 302 is configured to process multi-channel input 301 to generate luma output 303. In a particular aspect, the multi-channel input 301 corresponds to a particular sampling format (e.g., YUV 444 format, YUV 422 format, YUV 420 format, YUV 411 format, or another sampling format). The multi-channel input 301 corresponds to multiple channels. In a particular aspect, the multiple channels correspond to RGB color space, YUV color space, XYZ color space, HSV color space, or another color space.

In a particular aspect, the multi-channel input 301 corresponds to the first distorted image 111 of FIG. 1 and the luma output 303 corresponds to the first modified image 121 of FIG. 1. In particular aspect, the multi-channel input 301 corresponds to the upsampled multi-channel image data 213 of FIG. 2 and the luma output 303 corresponds to the first modified image data 215 of FIG. 2.

The luma output 303 has a second resolution that is greater than a first resolution of the multi-channel input 301 and corresponds to fewer channels than the multi-channel input 301. For example, the multi-channel input 301 corresponds to one or more first channels (e.g., a luma channel) and one or more second channels (e.g., chrominance channels), and the luma output 303 corresponds to the one or more first channels (e.g., the luma channel) and does not correspond to the one or more second channels (e.g., the chrominance channels).

Referring to FIG. 3B, a color saturation network 304 is shown that, in some implementations, is included in the adapted network 134 of FIG. 1. The color saturation network 304 is configured to process the multi-channel input 301 to generate chroma output 305. In a particular aspect, the multi-channel input 301 corresponds to the first distorted image 111 of FIG. 1 and the chroma output 305 corresponds to the first modified image 121 of FIG. 1. In particular aspect, the multi-channel input 301 corresponds to the upsampled multi-channel image data 213 of FIG. 2 and the chroma output 305 corresponds to the first modified image data 215 of FIG. 2.

The chroma output 305 corresponds to fewer channels than the multi-channel input 301. For example, the multi-channel input 301 corresponds to one or more first channels (e.g., one or more first chrominance channels) and one or more second channels (e.g., a luma channel, one or more second chrominance channels, or a combination thereof). The chroma output 305 corresponds to the one or more first channels (e.g., the first chrominance channels) and does not correspond to the one or more second channels (e.g., the luma channel or the second chrominance channels).

Referring to FIG. 3C, a detail enhancement network 306 is shown that, in some implementations, is included in the adapted network 134 of FIG. 1. The detail enhancement network 306 is configured to process the multi-channel input 301 to generate luma output 307. In a particular aspect, the multi-channel input 301 corresponds to the first distorted image 111 of FIG. 1 and the luma output 307 corresponds to the first modified image 121 of FIG. 1. In particular aspect, the multi-channel input 301 corresponds to the upsampled multi-channel image data 213 of FIG. 2 and the luma output 307 corresponds to the first modified image data 215 of FIG. 2.

The luma output 307 corresponds to fewer channels than the multi-channel input 301. For example, the multi-channel input 301 corresponds to one or more first channels (e.g., a luma channel) and one or more second channels (e.g., one or more chrominance channels). The luma output 307 corresponds to the one or more first channels (e.g., the luma channel) and does not correspond to the one or more second channels (e.g., the chrominance channels). In a particular aspect, the luma output 307 corresponds to greater image detail and visibility as compared to the multi-channel input 301.

Referring to FIG. 3D, a contrast enhancement network 308 is shown that, in some implementations, is included in the adapted network 134 of FIG. 1. The contrast enhancement network 308 is configured to process the multi-channel input 301 to generate luma output 309. In a particular aspect, the multi-channel input 301 corresponds to the first distorted image 111 of FIG. 1 and the luma output 309 corresponds to the first modified image 121 of FIG. 1. In particular aspect, the multi-channel input 301 corresponds to the upsampled multi-channel image data 213 of FIG. 2 and the luma output 309 corresponds to the first modified image data 215 of FIG. 2.

The luma output 309 corresponds to fewer channels than the multi-channel input 301. For example, the multi-channel input 301 corresponds to one or more first channels (e.g., a luma channel) and one or more second channels (e.g., one or more chrominance channels). The luma output 309 corresponds to the one or more first channels (e.g., the luma channel) and does not correspond to the one or more second channels (e.g., the chrominance channels). In a particular aspect, the luma output 309 corresponds to greater image contrast as compared to the multi-channel input 301.

Referring to FIG. 3E, a style transfer network 310 is shown that, in some implementations, is included in the adapted network 134 of FIG. 1. The style transfer network 310 is configured to process the multi-channel input 301 to generate luma output 311. In a particular aspect, the multi-channel input 301 corresponds to the first distorted image 111 of FIG. 1 and the luma output 311 corresponds to the first modified image 121 of FIG. 1. In particular aspect, the multi-channel input 301 corresponds to the upsampled multi-channel image data 213 of FIG. 2 and the luma output 311 corresponds to the first modified image data 215 of FIG. 2.

The luma output 311 corresponds to fewer channels than the multi-channel input 301. For example, the multi-channel input 301 corresponds to one or more first channels (e.g., a luma channel) and one or more second channels (e.g., one or more chrominance channels). The luma output 311 corresponds to the one or more first channels (e.g., the luma channel) and does not correspond to the one or more second channels (e.g., the chrominance channels). In a particular aspect, the luma output 311 corresponds to a second style that is distinct from a first style of the multi-channel input 301. In a particular example, the first style corresponds to an original style that is captured by an image sensor and the second style is associated with a particular artist or image (e.g., a Kandinsky style). The style transfer network 310 is trained to generate the luma output 311 by modifying the multi-channel input 301 to more closely (e.g., not exactly) match the second style (e.g., a particular Kandinsky image).

In a particular aspect, each of the upscaling network 302, the color saturation network 304, the detail enhancement network 306, the contrast enhancement network 308, and the style transfer network 310 is trained to use the same information as input (e.g., the multi-channel input 301) and generate a different output corresponding to a different purpose (e.g., upscaling, color saturation, detail enhancement, contrast enhancement, or style transfer).

Figure 4:
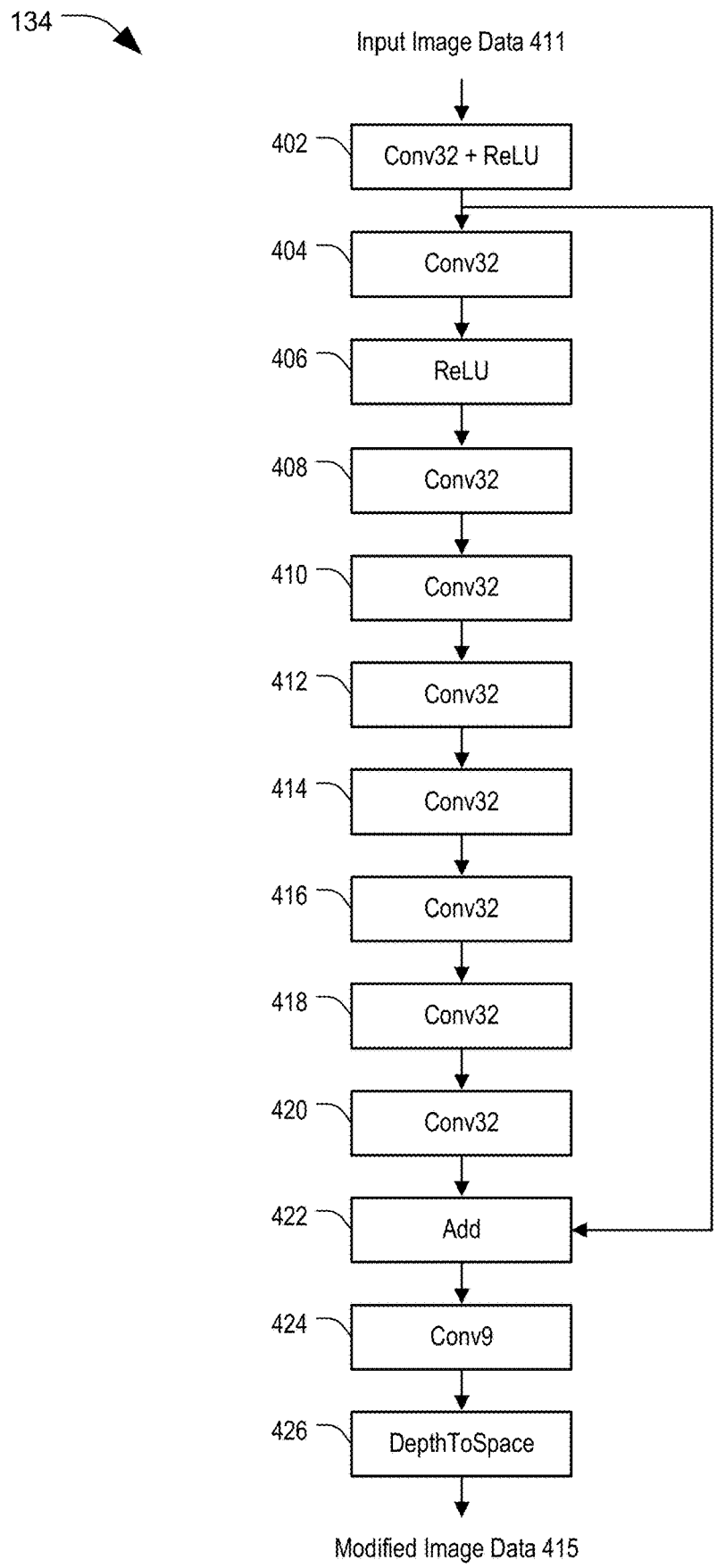
FIG. 4 is a diagram of an example of an adapted network of the system of FIG. 1, in accordance with some examples of the present disclosure.

Referring to FIG. 4, an example of the adapted network 134 is shown. In a particular aspect, the adapted network 134 includes a convolutional neural network (CNN). For example, the adapted network 134 includes convolutional layers with several filters that can convolve on an image spatially to detect features like edges and shapes. Stacked filters can detect complex spatial shapes. The adapted network 134 includes a convolutional layer and a rectified linear unit (ReLU) 402 coupled via a convolutional layer 404 to a ReLU 406. The ReLU 406 is coupled via a convolutional layer 408, a convolutional layer 410, a convolutional layer 412, a convolutional layer 414, a convolutional layer 416, a convolutional layer 418, and a convolutional layer 420 to an add layer 422.

In a particular aspect, the adapted network 134 includes a skip connection. For example, the add layer 422 also receives the output of the convolutional layer and the ReLU 402. The add layer 422 combines the output of the convolutional layer 420 and the output of the convolution layer and the ReLU 402. The add layer 422 is coupled via a convolutional layer 424 to a Depth to Space layer 426.

During operation, the convolution layer and the ReLU 402 receives input image data 411, and the Depth to Space layer 426 outputs modified image data 415. In a particular aspect, the input image data 411 includes the first distorted image 111 and the modified image data 415 includes the first modified image 121. In a particular aspect, the input image data 411 includes the second distorted image 113 and the modified image data 415 includes the second modified image 123. In a particular aspect, the input image data 411 includes the upsampled multi-channel image data 213 and the modified image data 415 includes the first modified image data 215. In a particular aspect, the input image data 411 includes the multi-channel input 301 and the modified image data 415 includes the luma output 303, the chroma output 305, the luma output 307, the luma output 309, or the luma output 311.

It should be understood that the adapted network 134 including particular components is provided as an illustrative example. In other examples, the adapted network 134 includes fewer, additional, or different components.

Figure 5:
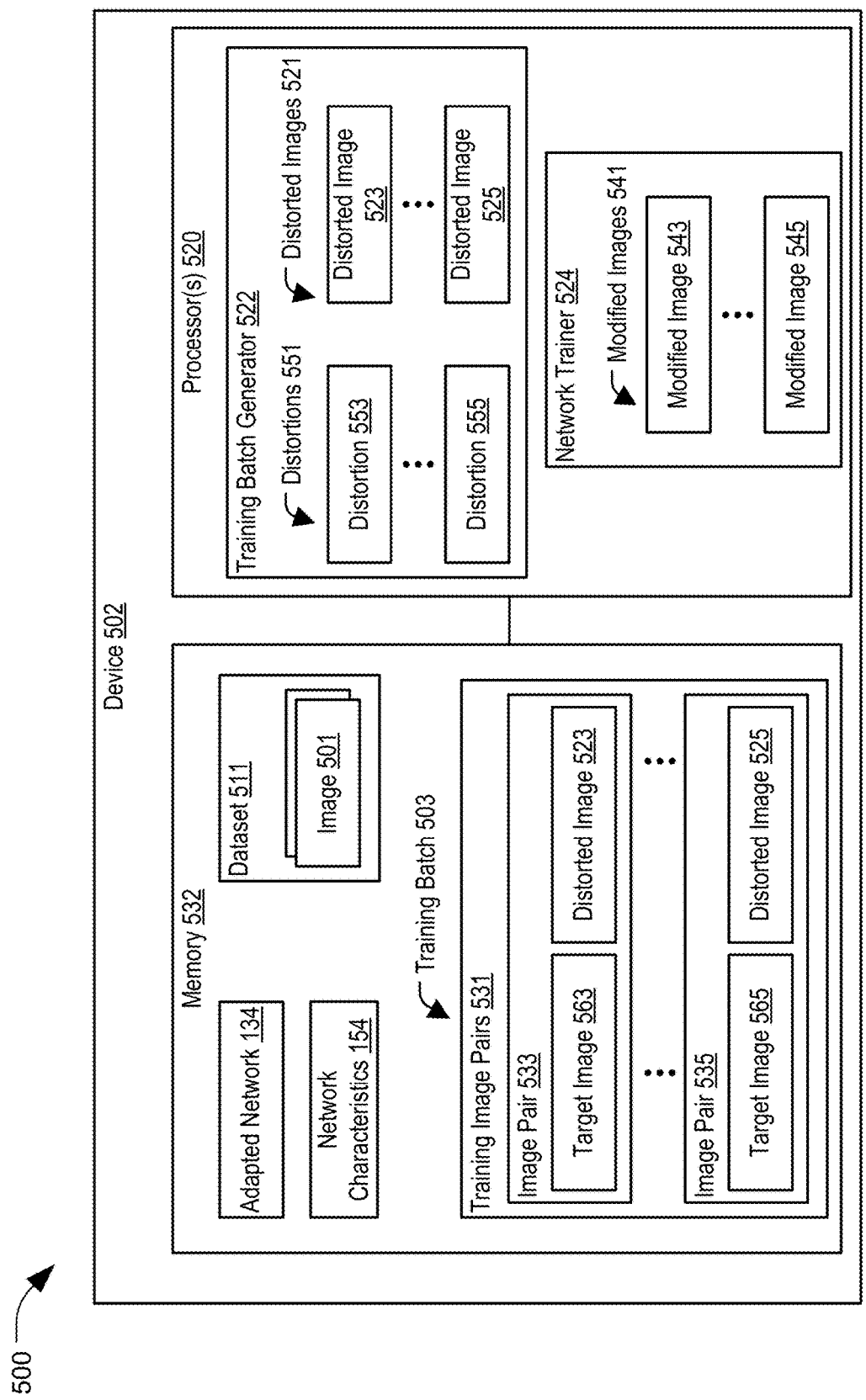
FIG. 5 is a diagram of a particular illustrative aspect of a system operable to train an adapted network to process images of a video stream, in accordance with some examples of the present disclosure.

Referring to FIG. 5, a particular implementation of a system operable to train an adapted network to process images of a video stream is shown and generally designated 500. The system 500 includes a device 502. In a particular aspect, the device 502 includes the device 102. In an alternative aspect the device 502 is coupled to the device 102.

The device 502 includes a memory 532 coupled to one or more processors 520. The memory 532 is configured to store a dataset 511 of one or more images, such as an image 501 (e.g., a training image), one or more additional images, or a combination thereof. For example, the dataset 511 includes one or more high quality (e.g., high resolution) images. The one or more processors 520 include a training batch generator 522, a network trainer 524, or both. The training batch generator 522 is configured to generate one or more training batches from one or more images of the dataset 511. For example, the training batch generator 522 is configured to generate a training batch 503 based on the image 501, one or more additional images, or a combination thereof. The network trainer 524 is configured to train (e.g., generate or update) the adapted network 134 based on the one or more training batches (e.g., the training batch 503).

During a batch generation stage, the training batch generator 522 generates a training batch by applying distortions to one or more images. In a particular implementation, the training batch generator 522 randomly selects the one or more images from the dataset 511 and applies distortions to the selected images to generate distorted images. For example, the training batch generator 522 selects the image 501 from the dataset 511 and applies distortions 551 (e.g., 16 distortions, such as 16 different pixel shifts prior to downscaling, 16 different compression distortions, or both) to the image 501 to generate distorted images 521 (e.g., 16 distorted images with 16 different sub-pixel shifts or 16 different compression distortions). To illustrate, the training batch generator 522 applies a distortion 553 to the image 501 to generate a distorted image 523, and applies a distortion 555 to the image 501 to generate a distorted image 525. The distortion 555 is distinct from the distortion 553, and the distorted image 525 is distinct from the distorted image 523. In a particular aspect, each of the distorted images 521 of a training batch is generated by applying different distortions to the same image (e.g., the image 501). The training batch can thus be used to generate the same (or similar) outputs for different distortions.

In a particular example, the distorted image 525 has a sub-pixel shift relative to the distorted image 523, as further described with reference to FIGS. 6A-6B. In another example, applying the distortion 553 includes applying a first compression level to compress the image 501 to generate the distorted image 523, and applying the distortion 555 includes applying a second compression level to compress the image 501 to generate the distorted image 525, where the second compression level is different than the first compression level. In a particular aspect, applying the distortion 553 includes applying a first pixel shift to the image 501 to generate a first shifted image and downscaling the first shifted image to generate the distorted image 523. Applying the distortion 555 includes applying a second pixel shift to the image 501 to generate a second shifted image and downscaling the second shifted image to generate the distorted image 525. In a particular aspect, the second pixel shift is different than the first pixel shift. It should be understood that particular distortions are provided as illustrative examples. In other implementations, various types of distortions can be applied to the image 501 to generate the distorted images 521.

The training batch generator 522 generates training image pairs 531 (e.g., 16 image pairs) of the training batch 503 based on the distorted images 521 (e.g., 16 distorted images). For example, each of the training image pairs 531 includes a target image (e.g., a high resolution image) that is based on the image 501 and a particular one of the distorted images 521 (e.g., a low resolution image). To illustrate, an image pair 533 of the training image pairs 531 includes a target image 563 and the distorted image 523. An image pair 535 of the training image pairs 531 includes a target image 565 and the distorted image 525. Each of the target image 563 and the target image 565 is based on the image 501.

In a particular implementation, the target image 563 (e.g., the image 501) is the same as the target image 565 (e.g., the image 501). For example, each of the training image pairs 531 includes the image 501 and a particular one of the distorted images 521. In a particular aspect, each of the training image pairs 531 includes the image 501 when the distorted images 521 are generated by using various compression codecs and bit rates. In an alternative implementation, the target image 563 is different from the target image 565. For example, the training batch generator 522 generates partially distorted images from the image 501, generates a particular one of the distorted images 521 from a particular one of the partially distorted images, and each of the training image pairs 531 includes a particular one of the partially distorted images as a target image and a corresponding one of the distorted images 521. To illustrate, the training batch generator 522 generates the target image 563 by applying a first distortion (e.g., a first pixel shift) to the image 501, and generates the target image 565 by applying a second distortion (e.g., a second pixel shift) to the image 501. The first distortion is different than the second distortion.

In a particular aspect, the training batch generator 522 generates the distorted image 523 by applying a first particular distortion (e.g., downscaling) to the target image 563, and generates the distorted image 525 by applying a second particular distortion (e.g., downscaling) to the target image 565. In a particular example, each of the distorted image 523 and the distorted image 525 is downscaled by the same scaling factor relative to the target image 563 and the target image 565, respectively. The first particular distortion of the distorted image 523 differs from the second particular distortion of the distorted image 525 because the downscaling filters are applied after different pixel shifts. As an illustrative example, the target image 563 includes first four pixels denoted as A, B, C, and D, and a downscaling factor of 4 is applied to the target image 563 to generate the distorted image 523. The distorted image 523 includes a first pixel that has a first pixel value (e.g., (A+B+C+D)/4) that is based on the pixel values of A, B, C, and D. In this example, the target image 565 has a pixel shift of one relative to the target image 563 and has first four pixels denoted as B, C, D, and E, and the downscaling factor of 4 is applied to the target image 565. The distorted image 525 includes a first pixel that has a second pixel value (e.g., (B+C+D+E)/4). Although the same downscaling factors and the same downscaling filters are applied to the target image 563 and the target image 565, the pixel shift of the target image 565 relative to the target image 563 results in a sub-pixel shift in the distorted image 525 relative to the distorted image 523.

In a particular implementation, the training batch 503 includes the training image pairs 531 generated from a single image (e.g., the image 501) of the dataset 511. In an alternative implementation, the training batch 503 includes training image pairs generated from multiple images of the dataset 511. For example, in this implementation, the training batch 503 includes the training image pairs 531 (e.g., 8 image pairs) generated by applying the distortions 551 (e.g., 8 different distortions) to the image 501, a second set of training image pairs (e.g., 8 additional image pairs) generated by applying second distortions (e.g., 8 different distortions) to a second image of the dataset 511, one or more additional sets of training image pairs, or a combination thereof.

The network trainer 524, during a batch training stage, trains the adapted network 134 based on the training batch 503. For example, the network trainer 524 provides each distorted image of each training image pair of the training batch 503 to the adapted network 134 to generate a modified image. To illustrate, network trainer 524 provides the distorted image 523 of the image pair 533 to the adapted network 134 to generate a modified image 543, and provides the distorted image 525 to the adapted network 134 to generate a modified image 545. The network trainer 524 determines a model error for a training image pair based on a comparison of a target image of the training image pair and a corresponding modified image. For example, the network trainer 524 determines a model error for the image pair 533 based on a difference between the target image 563 and the modified image 543, and determines a model error for the image pair 535 based on a difference between the target image 565 and the modified image 545.

The network trainer 524 determines a loss value for the batch training stage based on the model errors for the training batch 503. For example, the network trainer 524 determines the loss value based on a sum of the model error for the image pair 533, the model error for the image pair 535, one or more additional model errors of one or more additional image pairs of the training batch 503, or a combination thereof. In a particular aspect, the loss value is calculated based on a loss function of the adapted network 134. The network trainer 524 updates the adapted network 134 to reduce the loss value (e.g., the loss function). For example, the network trainer 524 trains the adapted network 134 to reduce a predicted loss value of a subsequent batch training stage. To illustrate, the network trainer 524 trains the adapted network 134 by updating weights, biases, or a combination thereof, of one or more network layers of the adapted network 134 based on the loss value for the batch training stage. In a particular aspect, the network trainer 524 uses a generative adversarial network (GAN) technique to train the adapted network 134.

In an illustrative example, the adapted network 134 is trained to generate the same pixel values (or similar pixel values that are within a tolerance threshold) for the modified image 543 (to match the target image 563) as for the modified image 545 (to match the target image 565). The adapted network 134 is thus trained to generate the same (or similar) first pixel values (e.g., approximately A, B, C, and D) for the modified image 543 corresponding to a first distortion (e.g., (A+B+C+D)/4) as second pixel values (e.g., approximately B, C, D, and E) generated for the modified image 545 corresponding to a second distortion (e.g., (B+C+D+E)/4). The second pixel values may be shifted relative to the first pixel values.

In a particular aspect, the network trainer 524, subsequent to updating the adapted network 134, trains the adapted network 134 using a second training batch during a subsequent batch training stage. In a particular aspect, the second training batch is based on one or more second images of the dataset 511. For example, the training batch generator 522 generates the second training batch based on one or more second images of the dataset 511 that are distinct from the one or more images of the dataset 511 used to generate the training batch 503. Each training batch thus includes multiple distorted images corresponding to the same image of the dataset 511, and different training batches include distorted images corresponding to different images of the dataset 511. In a particular aspect, the network trainer 524 iteratively trains the adapted network 134 based on training batches during multiple batch training stages until a convergence criterion is met (e.g., the loss function of the adapted network 134 is reduced or minimized). The network trainer 524 thus iteratively trains the adapted network 134 such that a difference between distorted images and target images is reduced.

The adapted network 134 is trained over time to produce modified images that match (e.g., approximate) the target images for input images with various distortions (e.g., various downscaling artifacts due to various sub-pixel shifts). For example, the distorted image 523 corresponds to the distortion 553 (e.g., first downscaling artifacts due to a first sub-pixel shift) and the distorted image 525 corresponds to the distortion 555 (e.g., second downscaling artifacts due to a second sub-pixel shift). The adapted network 134 is trained to produce a first modified image for the distorted image 523 that approximates the target image 563 (e.g., a first integer pixel shift of the image 501) and a second modified image for the distorted image 525 that approximates the target image 565 (e.g., a second integer pixel shift of the image 501) that is similar to the target image 563 (e.g., with a different integer pixel shift), thereby reducing distortion differences between the first modified image and the second modified image corresponding to different distortions (e.g., different downscaling artifacts due to different sub-pixel shifts). As a result, in a particular example, when movement of an object in the video stream results in sub-pixel shifts in the location of the object from image to image in the video stream, use of the adapted network 134 reduces or eliminates temporal flicker, jitter, or jumps visible to a viewer that may otherwise result from using an adapted network that is trained without using the training image pairs 531 because the adapted network 134 is trained to produce similar images for various distortions without (or with reduced) downscaling or compression artifacts.

The adapted network 134 learns to produce the same image (although may be pixel shifted) for different distortions because image pairs of a particular training batch includes distorted images generated by applying multiple different distortions to the same source image. A network, trained using other techniques in which a training batch is generated by applying distortions to different source images, is not able to produce the same image for different distortions and the output of the network will result in temporal flicker and jitter when successive video frames have different distortions.

It should be understood that the device 502 including the training batch generator 522 and the network trainer 524 is provided as an illustrative example. In some implementations, the training batch generator 522 and the network trainer 524 are integrated in different devices, and the network trainer 524 receives one or more training batches from the training batch generator 522.

In a particular aspect, the network trainer 524 is configured to generate the network characteristics 154 (e.g., labels) associated with the adapted network 134. In a particular aspect, the network characteristics 154 are based on default data, user input, a configuration setting, a sensor input, a particular user, or a combination thereof. In a particular aspect, the network characteristics 154 indicate that the adapted network 134 is trained for a particular user, a particular location, a particular purpose, a particular event, or a combination thereof. For example, the network trainer 524 updates the network characteristics 154 to label the adapted network 134 as trained for a particular user in response to determining based on user input that the adapted network 134 is generated (or update) for the particular user. In a particular example, the network trainer 524 updates the network characteristics 154 to label the adapted network 134 as trained for a particular user in response to determining that the particular user is logged into the device 502 during training of the network characteristics 154.

In a particular example, the network trainer 524 updates the network characteristics 154 to label the adapted network 134 as trained for a particular location in response to determining that the device 502 is located at the particular location, receiving user input indicating the particular location, or both. In a particular example, the network trainer 524 updates the network characteristics 154 to label the adapted network 134 as trained for a purpose in response to determining that the adapted network 134 is being trained for the purpose. To illustrate, the network trainer 524 determines that the adapted network 134 is being trained for a purpose based on user input, an active application of the device 502, a calendar event of the device 502, or a combination thereof. In a particular example, the network trainer 524 updates the network characteristics 154 to label the adapted network 134 as trained for an event in response to determining that the adapted network 134 is being trained for the event. To illustrate, the network trainer 524 determines that the adapted network 134 is being trained for an event based on user input, an active application of the device 502, a calendar event of the device 502, or a combination thereof.

In a particular example, the network trainer 524 updates the network characteristics 154 to label the adapted network 134 as trained for a particular location in response to determining that the device 502 is located at the particular location, receiving user input indicating the particular location, or both. In a particular example, the network trainer 524 updates the network characteristics 154 to indicate label the adapted network 134 as trained for a purpose in response to determining that the adapted network 134 is being trained for the purpose. To illustrate, the network trainer 524 determines that the adapted network 134 is being trained for a purpose based on user input, an active application of the device 502, a calendar event of the device 502, or a combination thereof. In a particular example, the network trainer 524 updates the network characteristics 154 to label the adapted network 134 as trained for an event in response to determining that the adapted network 134 is being trained for the event. To illustrate, the network trainer 524 determines that the adapted network 134 is being trained for an event based on user input, an active application of the device 502, a calendar event of the device 502, or a combination thereof.

In a particular aspect, the network trainer 524 provides the adapted network 134, the network characteristics 154, or a combination thereof, to the device 102 of FIG. 1. In a particular aspect, particular types of distortions, training images, or a combination thereof, are associated with particular characteristics (e.g., a particular user, a particular location, a particular purpose, a particular event, or a combination thereof). In a particular example, the distortions 551, the image 501, or a combination thereof, are specific to a particular user, a particular location, a particular purpose, a particular event, or a combination thereof, associated with training the adapted network 134. Labeling the adapted network 134 with the network characteristics 154 enables identifying the adapted network 134 as trained for the particular user, the particular location, the particular purpose, the particular event, or a combination thereof. Using the training image pairs 531 enables the adapted network 134 to be trained to generate modified images that approximate similar images for various different distortions (e.g., the distortions 551) so that distortion differences between the modified images are reduced. The adapted network 134 is trained to generate each modified image based on a single input image enabling faster and more efficient (e.g., uses fewer computing cycles) processing of input images of a video stream as compared to multi-image processing. The adapted network 134 can thus provide reduced distortion differences using single-image processing that is faster and more efficient than multi-image processing.

Referring to FIG. 6A, examples of applying the distortion 553 and the distortion 555 are shown. In a particular aspect, the training batch generator 522 of FIG. 5 includes an image shifter 602 and a downscaler 604. The image shifter 602 is configured to generate shifted images 611 by applying various pixel shifts to the image 501. The downscaler 604 is configured to generate the distorted images 521 by downscaling each of the shifted images 611.

Applying the distortion 553 includes providing the image 501 to the image shifter 602. The image shifter 602 generates a shifted image 613 by applying a first pixel shift to the image 501. The downscaler 604 generates the distorted image 523 by downscaling the shifted image 613. In a particular aspect, applying the distortion 553 includes applying the first pixel shift to the image 501, downscaling the shifted image 613, or both. Applying the distortion 555 includes providing the image 501 to the image shifter 602. The image shifter 602 generates a shifted image 615 by applying a second pixel shift to the image 501. The downscaler 604 generates the distorted image 525 by downscaling the shifted image 615. In a particular aspect, applying the distortion 555 includes applying the second pixel shift to the image 501, downscaling the shifted image 615, or both.

The distorted images 521 represent sub-pixel shifts relative to each other because of the downscaling subsequent to the pixel shifting. For example, the image shifter 602 generates the shifted image 613 by shifting the image 501 in a first direction (e.g., left) by a first count of pixels (e.g., 1 pixel) and in a second direction (e.g., up) by a second count of pixels (e.g., 2 pixels). The shifted image 613 has the same pixel values as the image 501 in a different location than in the image 501. The downscaler 604 generates the distorted image 523 by downscaling the shifted image 613 by a downscaling factor (e.g., ⅓). The distorted image 523 corresponds to a first sub-pixel shift (e.g., ⅓) in the first direction (e.g., left) and a second sub-pixel shift (e.g., ⅔) in the second direction (e.g. up). As another example, the image shifter 602 generates the shifted image 615 by applying different pixel shifts to the image 501, thereby resulting in different sub-pixel shifts in the distorted image 525 relative to the distorted image 523. The shifted image 615 has the same pixel values as the image 501 (and the shifted image 613) in a different location than in the image 501 (and than in the shifted image 613). Due to different sub-pixel shifts in the distorted image 525 as compared to the distorted image 523, pixel values in the distorted image 525 can be different from pixel values in the distorted image 523.

In a particular implementation, each of the training image pairs 531 of FIG. 5 includes the image 501 and a particular one of the distorted images 521 generated by the downscaler 604. For example, the image pair 533 includes the image 501 (e.g., as the target image 563) and the distorted image 523. As another example, the image pair 535 includes the image 501 (e.g., as the target image 565) and the distorted image 525. In another implementation, each of the training image pairs 531 includes a particular one of the shifted images 611 generated by the image shifter 602 and a corresponding one of the distorted images 521 generated by the downscaler 604. For example, the image pair 533 includes the shifted image 613 (e.g., as the target image 563) and the distorted image 523. As another example, the image pair 535 includes the shifted image 615 (e.g., as the target image 565) and the distorted image 525. In a particular aspect, training image pairs generated from the same source image with different distortions are included in the same training batch. For example, the training image pairs 531 constructed from the image 501 with different distortions are included in the training batch 503.

Referring to FIG. 6B, examples of applying the distortion 553 and the distortion 555 are shown. Instead of pixel shifting and downscaling to generate the distorted images 521 having sub-pixel shifts, as described with reference to FIG. 6A, downscaling and interpolation can be used to generate the distorted images 521 having sub-pixel shifts. For example, the training batch generator 522 of FIG. 5 includes the downscaler 604 and an interpolator 606. The downscaler 604 is configured to generate a downscaled image 623 by downscaling the image 501 using a downscaling factor. The interpolator 606 is configured to generate the distorted images 521 by applying interpolation to the downscaled image 623 to generate the distorted images 521 having sub-pixel shifts.

In aspects in which the shifted images 611 are used as target images for the training image pairs 531, pixel shifting can be used to generate the shifted images 611. For example, the training batch generator 522 includes the image shifter 602. The image shifter 602 is configured to generate the shifted images 611 by applying various pixel shifts to the image 501.

During operation, the downscaler 604 generates a downscaled image 623 by downscaling the image 501 by a downscaling factor. The interpolator 606 generates the distorted image 523 by applying a first interpolation function to the downscaled image 623. In a particular aspect, applying the distortion 553 includes downscaling the image 501. In a particular aspect, applying the distortion 553 also includes applying the first interpolation function to the downscaled image 623. The interpolator 606 generates the distorted image 525 by applying a second interpolation function to the downscaled image 623. In a particular aspect, applying the distortion 555 includes downscaling the image 501. In a particular aspect, applying the distortion 555 also includes applying the second interpolation function to the downscaled image 623. The first interpolation function is different from the second interpolation function resulting in the distorted image 523 that is different from the distorted image 525.

The distorted images 521 represent sub-pixel shifts relative to each other because of the interpolation subsequent to the downscaling. For example, the downscaler 604 generates the downscaled image 623 by downscaling the image 501 by a downscaling factor (e.g., ⅓). The interpolator 606 generates the distorted image 523 by applying a first interpolation function to pixel values of the downscaled image 623 so that the distorted image 523 corresponds to a first sub-pixel shift (e.g., ⅓) in the first direction (e.g., left) and a second sub-pixel shift (e.g., ⅔) in the second direction (e.g. up). As another example, the interpolator 606 generates the distorted image 525 by applying a different interpolation function to pixel values of the downscaled image 623, thereby resulting in different sub-pixel shifts in the distorted image 525 relative to the distorted image 523.

In a particular implementation, each of the training image pairs 531 of FIG. 5 includes the image 501 and a particular one of the distorted images 521 generated by the interpolator 606. For example, the image pair 533 includes the image 501 (e.g., as the target image 563) and the distorted image 523. As another example, the image pair 535 includes the image 501 (e.g., as the target image 565) and the distorted image 525. In another implementation, the image shifter 602 generates the shifted images 611, as described with reference to FIG. 6A, and each of the training image pairs 531 includes a particular one of the shifted images 611 generated by the image shifter 602 and a corresponding one of the distorted images 521 generated by the interpolator 606. For example, the image pair 533 includes the shifted image 613 (e.g., as the target image 563) and the distorted image 523. As another example, the image pair 535 includes the shifted image 615 (e.g., as the target image 565) and the distorted image 525.

In a particular aspect, the shifted image 613 corresponds to the distorted image 523 because the distorted image 523 approximates a downscaled version (e.g., the distorted image 523 of FIG. 6A) of the shifted image 613. As another example, the shifted image 615 corresponds to the distorted image 525 because the distorted image 525 approximates a downscaled version (e.g., the distorted image 525 of FIG. 6A) of the shifted image 615.

The training image pairs 531 described with reference to FIGS. 6A-6B are used to train the adapted network 134 to generate modified images that approximate target images having the same pixel values (e.g., that might be pixel shifted) for distorted images having different pixel values (e.g., different sub-pixel values due to use of downscaling filters and different phases caused by pixel shifts). The adapted network 134 trained using the training batch 503 including the training image pairs 531 produces the same image (or similar images having the same pixel values that might be pixel shifted) for images that are distorted differently due to different sub pixel shifts or other distortions.

Figure 7:
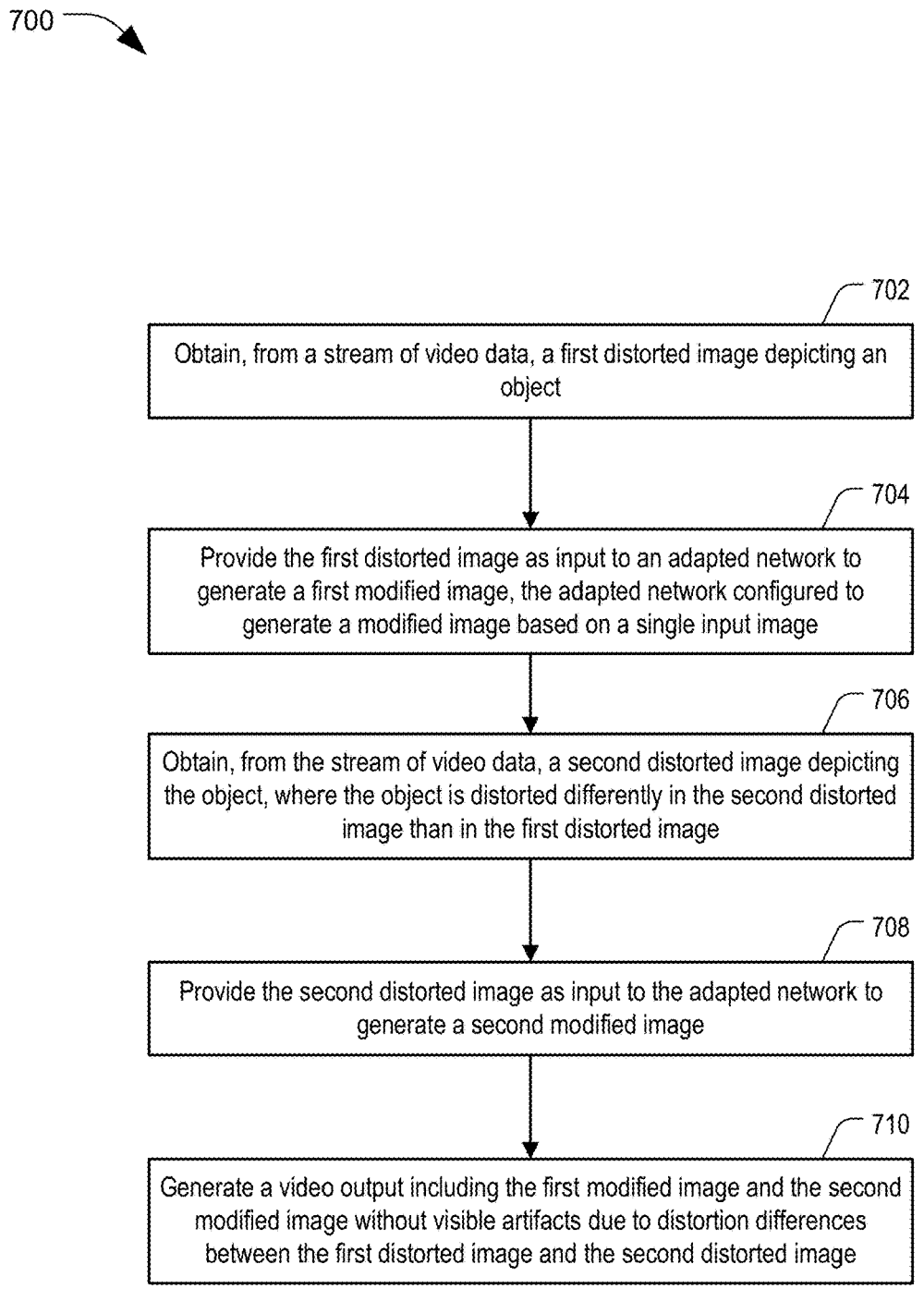
FIG. 7 is a flow diagram illustrating an example of a method of processing images of a video stream, in accordance with some examples of the present disclosure.

Referring to FIG. 7, a method of processing images of a video stream is depicted and generally designated 700. In a particular aspect, one or more operations of the method 700 are performed by the video processor 122, the adapted network 134, the one or more processors 120, the device 102, the system 100 of FIG. 1, the upscaling network 302 of FIG. 3A, the color saturation network 304 of FIG. 3B, the detail enhancement network 306 of FIG. 3C, the contrast enhancement network 308 of FIG. 3D, the style transfer network 310 of FIG. 3E, or a combination thereof.

The method 700 includes obtaining, from a stream of video data, a first distorted image depicting an object, at 702. For example, the video processor 122 of FIG. 1 obtains the first distorted image 111 from the stream 119, as described with reference to FIG. 1. In a particular aspect, the first distorted image 111 depicts the object 140.

The method 700 also includes providing the first distorted image as input to an adapted network to generate a first modified image, at 704. For example, the video processor 122 of FIG. 1 provides the first distorted image 111 as input to the adapted network 134 to generate the first modified image 121, as described with reference to FIG. 1. The adapted network 134 is configured to generate a modified image based on a single input image. For example, the adapted network 134 is configured to generate the first modified image 121 based on the first modified image 121 and independently of data corresponding to other images of the stream 119.

The method 700 further includes obtaining, from the stream of video data, a second distorted image depicting the object, at 706. For example, the video processor 122 of FIG. 1 obtains the second distorted image 113 from the stream 119, as described with reference to FIG. 1. In a particular aspect, the second distorted image 113 depicts the object 140. The object 140 is distorted differently in the second distorted image 113 than in the first distorted image 111.

The method 700 also includes providing the second distorted image as input to the adapted network to generate a second modified image, at 708. For example, the video processor 122 of FIG. 1 provides the second distorted image 113 as input to the adapted network 134 to generate the second modified image 123, as described with reference to FIG. 1.

The method 700 further includes generating a video output including the first modified image and the second modified image without visible artifacts due to distortion differences between the first distorted image and the second distorted image, at 710. For example, the video processor 122 generates the first output image 141 based on the first modified image 121 and generates the second output image 143 based on the second modified image 123. The video processor 122 generates video output (e.g., the stream 129) including the first output image 141 and the second output image 143. The stream 129 is without distortion differences between the first output image 141 and the second output image 143. The video processor 122 thus improves user experience by reducing (e.g., removing) temporal flicker, jitter, or jumps while viewing the stream 129 without incurring the delay or cost associated with multi-image processing.

Figure 8:
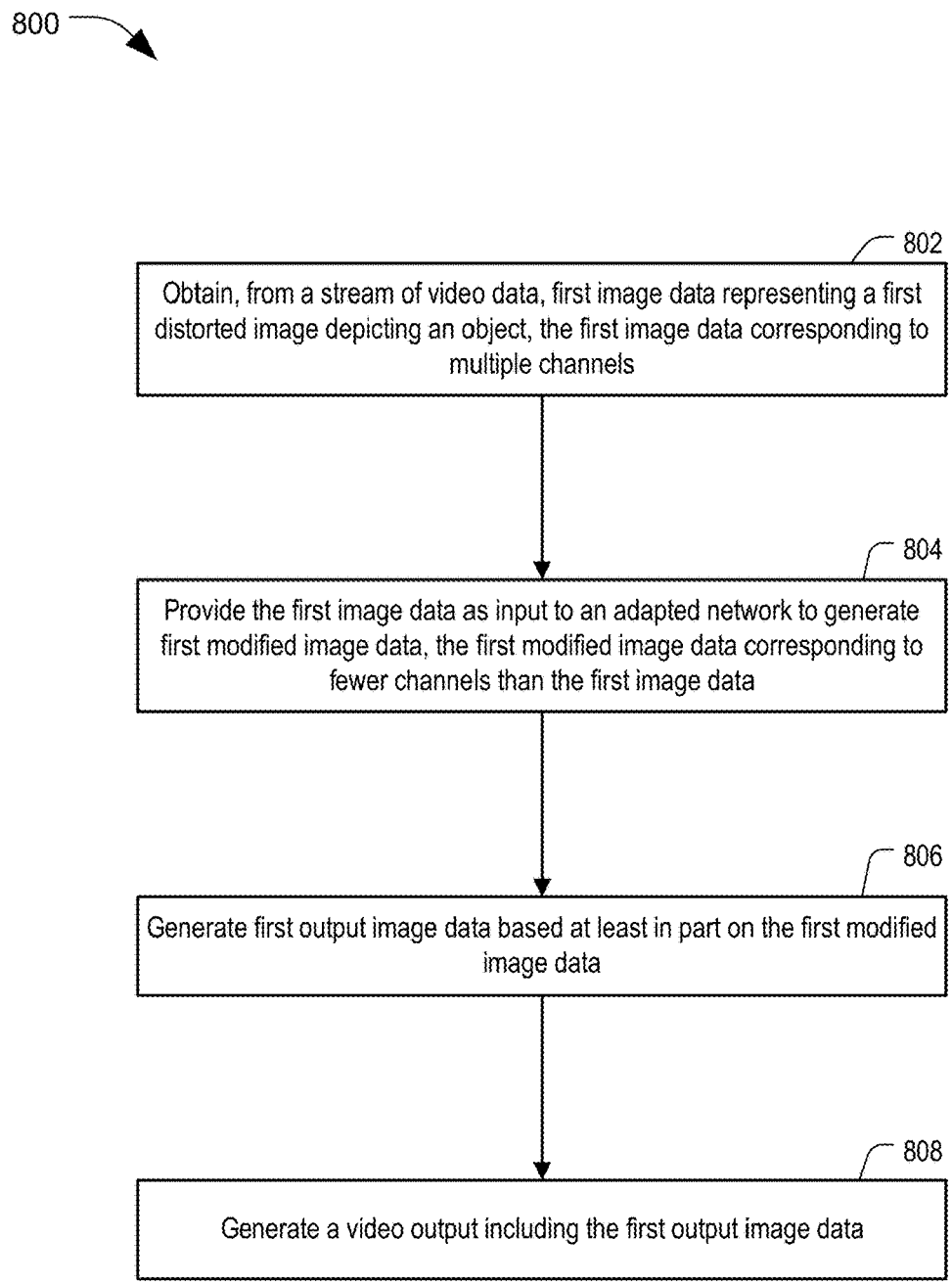
FIG. 8 is a flow diagram illustrating another example of a method of processing images of a video stream, in accordance with some examples of the present disclosure.

Referring to FIG. 8, a method of processing images of a video stream is depicted and generally designated 800. In a particular aspect, one or more operations of the method 800 are performed by the video processor 122, the adapted network 134, the one or more processors 120, the device 102, the system 100 of FIG. 1, the upscaling network 302 of FIG. 3A, the color saturation network 304 of FIG. 3B, the detail enhancement network 306 of FIG. 3C, the contrast enhancement network 308 of FIG. 3D, the style transfer network 310 of FIG. 3E, or a combination thereof.

The method 800 includes obtaining, from a stream of video data, first image data representing a first distorted image depicting an object, at 802. For example, the video processor 122 of FIG. 1 obtains image data representing the first distorted image 111 from the stream 119. The first distorted image 111 depicts the object 140, as described with reference to FIG. 1. The image data (e.g., the first distorted image 111) corresponds to multiple channels, as described with reference to FIG. 2.

The method 800 also includes providing the first image data as input to an adapted network to generate first modified image data, the first modified image data corresponding to fewer channels than the first image data, at 804. For example, the video processor 122 of FIG. 1 provides the first distorted image 111 (e.g., image data) as input to the adapted network 134 to generate the first modified image 121 (e.g., modified image data), as described with reference to FIG. 2.

The method 800 further includes generating first output image data based at least in part on the first modified image data, at 806. For example, the video processor 122 of FIG. 1 generates first output image 141 (e.g., output image data) based at least in part on the first modified image 121, as described with reference to FIG. 1.

The method 800 also includes generating a video output including the first output image data, at 808. For example, the video processor 122 of FIG. 1 includes generating a stream 129 (e.g., a video output) including the first output image 141, as described with reference to FIG. 1.

The method 800 thus enables using information associated with multiple channels to generate a modified image associated with fewer channels. Using the information associated with the multiple channels reduces (e.g., removes) distortions in the modified images to a greater extent as compared to using information associated with the fewer channels to generate modified images.

Figure 9:
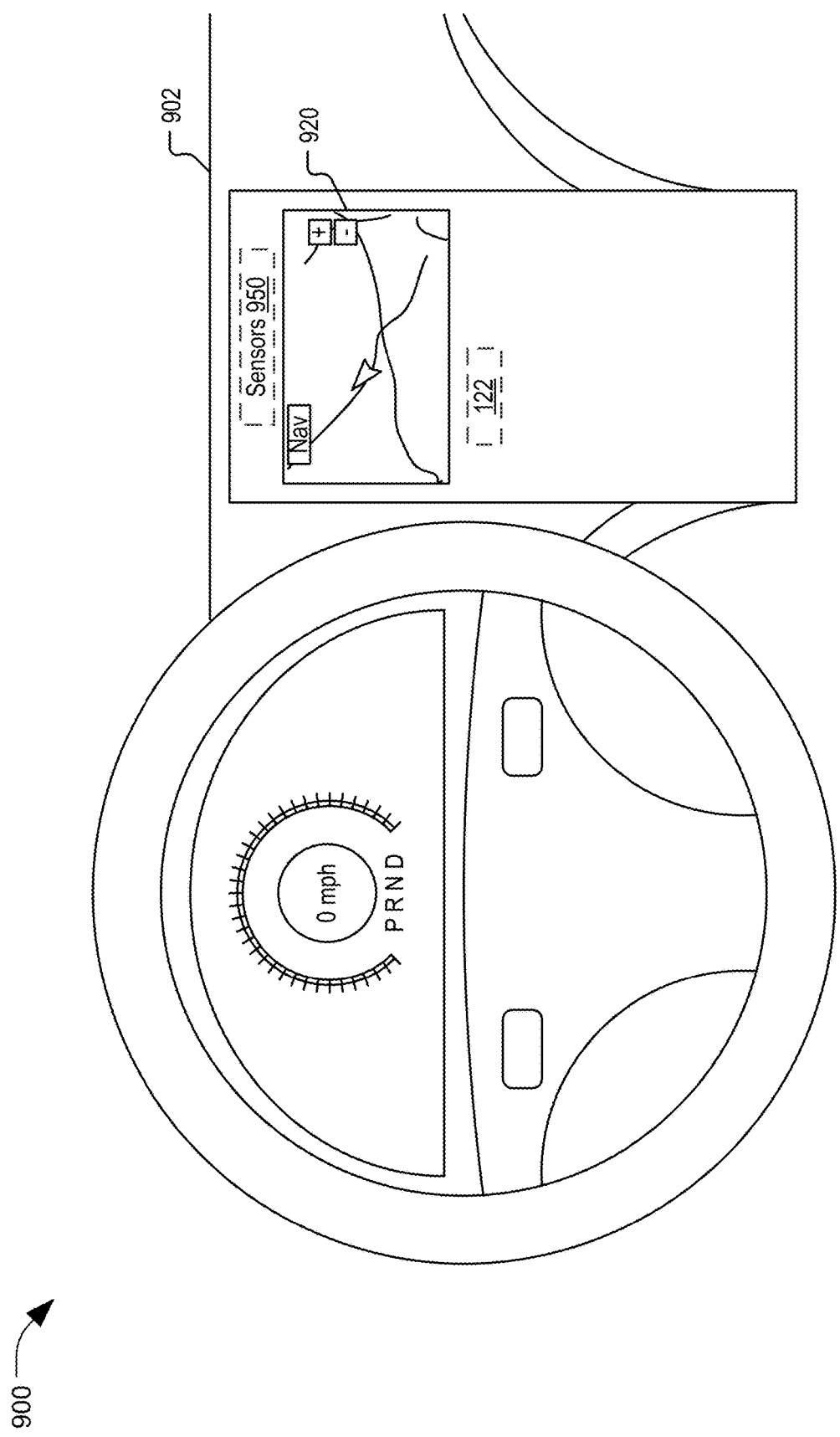
FIG. 9 is an illustrative example of a vehicle that incorporates aspects of the system of FIG. 1, in accordance with some examples of the present disclosure.

FIG. 9 is an illustrative example of a vehicle 900. According to one implementation, the vehicle 900 is a self-driving car. According to other implementations, the vehicle 900 can be a car, a truck, a motorcycle, an aircraft, a water vehicle, etc. The vehicle 900 includes a screen 920 (e.g., a display), one or more sensors 950, the video processor 122, or a combination thereof. The sensors 950 and the video processor 122 are shown using a dotted line to indicate that these components might not be visible to passengers of the vehicle 900. The video processor 122 can be integrated into the vehicle 900 or coupled to the vehicle 900. In a particular example, the video processor 122 is integrated into a vehicle dashboard device, such as a car dashboard device 902.

In a particular aspect, the video processor 122 is coupled to the screen 920 and outputs the stream 129 to the screen 920 or one or more other displays, such as seatback screens that are part of a vehicle entertainment system. In a particular aspect, the screen 920 corresponds to the display device 144 of FIG. 1.

In a particular aspect, the user 142 (or another user) can select an option displayed on the screen 920 to enable or disable a selection mode. For example, the network selector 124, in response to receiving a selection of a particular option, updates the selection criterion 125. To illustrate, the network selector 124 selects one of the upscaling network 302, the color saturation network 304, the detail enhancement network 306, the contrast enhancement network 308, or the style transfer network 310 as the adapted network 134 based on receiving a selection of a corresponding option. The sensors 950 include an image sensor, a microphone, a global positioning system (GPS) sensor, or a combination thereof. In a particular aspect, the network selector 124 updates the selection criterion 125 based on sensor input from one or more of the sensors 950. For example, the network selector 124 selects the adapted network 134 in response to determining that the network characteristics 154 match a location of the vehicle 900 indicated by the GPS sensor. Thus, the techniques described with respect to FIG. 1 enable a user in the vehicle 900 to initiate processing images of a video stream.

Figure 10A:
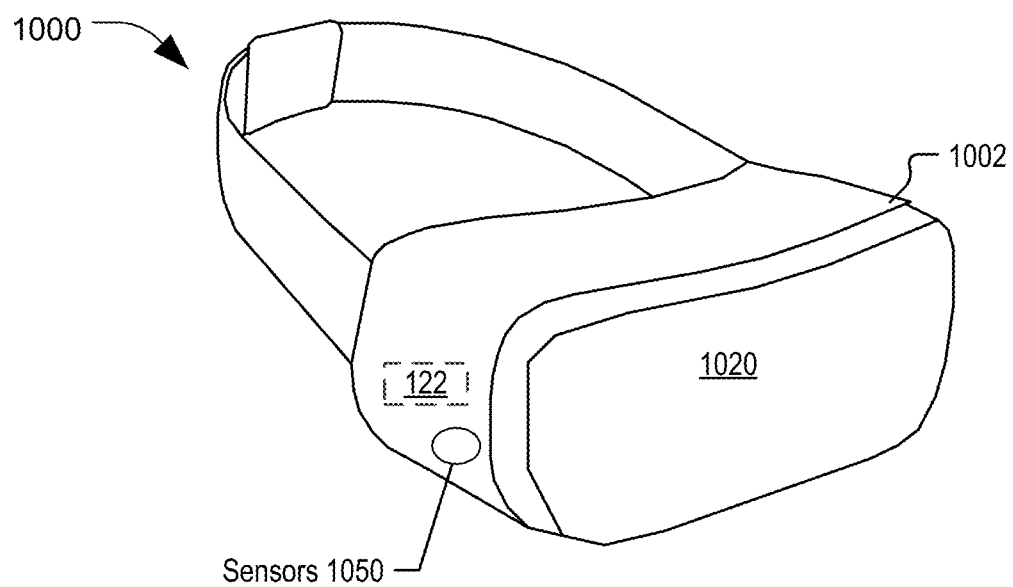
FIG. 10A is a diagram of a virtual reality or augmented reality headset that incorporates aspects of the system of FIG. 1, in accordance with some examples of the present disclosure.

FIG. 10A depicts an example of the video processor 122 integrated into a headset 1002, such as a virtual reality headset, an augmented reality headset, a mixed reality headset, an extended reality headset, a head-mounted display, or a combination thereof. A visual interface device, such as a display 1020, is positioned in front of the user's eyes to enable display of augmented reality or virtual reality images or scenes to the user while the headset 1002 is worn. In a particular example, the display 1020 corresponds to the display device 144 and is configured to display output (e.g., the stream 129) of the video processor 122, as described with reference to FIGS. 1 and 9. Sensors 1050 can include one or more microphones, cameras, GPS sensors, or other sensors, or a combination thereof. Although illustrated in a single location, in other implementations one or more of the sensors 1050 can be positioned at other locations of the headset 1002, such as an array of one or more microphones and one or more cameras distributed around the headset 1002 to detect multi-modal inputs.

Figure 10B:
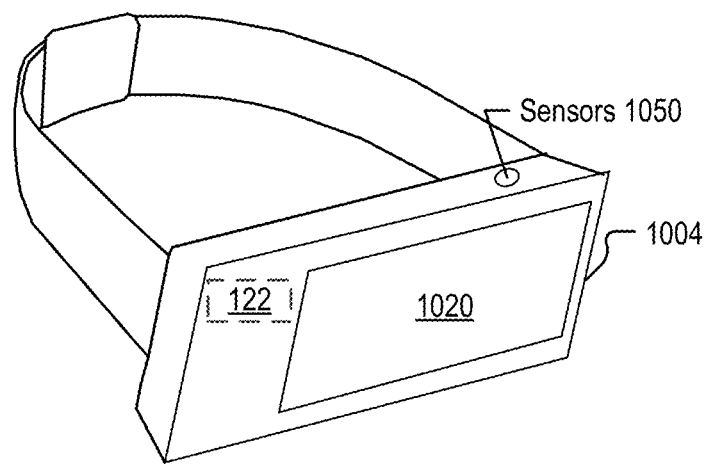
FIG. 10B is a diagram of a wearable electronic device that incorporates aspects of the system of FIG. 1, in accordance with some examples of the present disclosure.

FIG. 10B depicts an example of the video processor 122 integrated into a wearable electronic device 1004, illustrated as a "smart watch," that includes the display 1020 and the sensors 1050. The sensors 1050 enable detection, for example, of user input based on modalities such as video, speech, and gesture.

Figure 11:
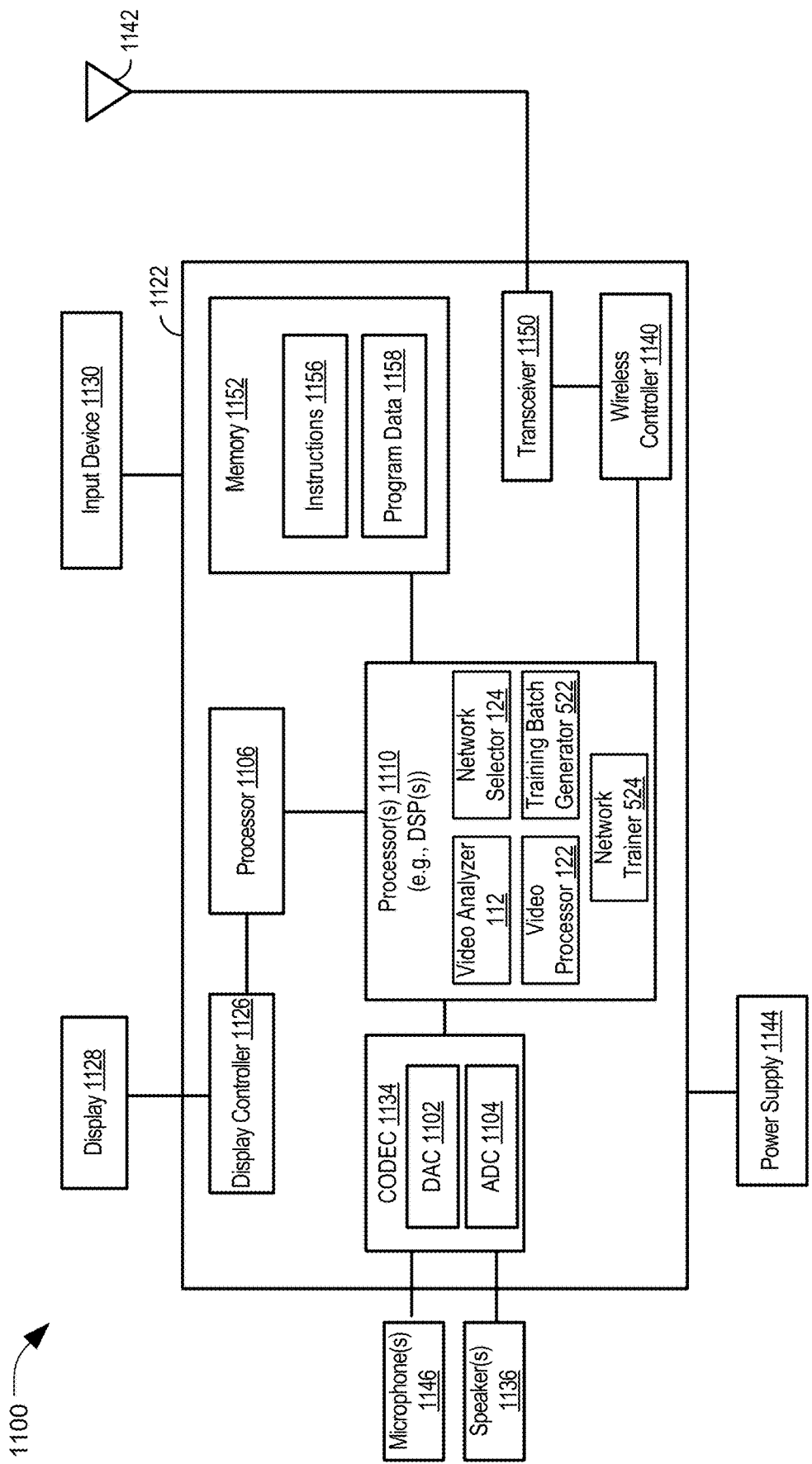
FIG. 11 is a block diagram of a particular illustrative example of a device that is operable to process images of a video stream, in accordance with some examples of the present disclosure.

Referring to FIG. 11, a block diagram of a particular illustrative implementation of a device is depicted and generally designated 1100. In various implementations, the device 1100 may have more or fewer components than illustrated in FIG. 11. In an illustrative implementation, the device 1100 corresponds to the device 102, the device 104 of FIG. 1, the device 502 of FIG. 5, or a combination thereof.

In an illustrative implementation, the device 1100 may perform one or more operations described with reference to FIGS. 1-10.

In a particular implementation, the device 1100 includes a processor 1106 (e.g., a central processing unit (CPU)). The device 1100 may include one or more additional processors 1110 (e.g., one or more DSPs). The processor 1110 may include the video analyzer 112, the video processor 122, the network selector 124, the training batch generator 522, the network trainer 524, or a combination thereof. In a particular aspect, the one or more processors 120 of FIG. 1 correspond to the processor 1106, the processor 1110, or a combination thereof.

The device 1100 may include a memory 1152 and a CODEC 1134. The memory 1152 may include instructions 1156 that are executable by the one or more additional processors 1110 (or the processor 1106) to implement one or more operations described with reference to FIGS. 1-10. In an example, the memory 1152 corresponds to the memory 132, the memory 136 of FIG. 1, or both, and includes a computer-readable storage device that stores the instructions 1156. The instructions 1156, when executed by one or more processors (e.g., the one or more processors 120, the processor 1106, or the processor 1110, as illustrative examples), cause the one or more processors to obtain, from a stream of video data, a first distorted image depicting an object. The instructions 1156, when executed by the one or more processors, also cause the one or more processors to provide the first distorted image as input to an adapted network to generate a first modified image. The adapted network is configured to generate a modified image based on a single input image. The instructions 1156, when executed by the one or more processors, also cause the one or more processors to obtain, from the stream of video data, a second distorted image depicting the object. The object is distorted differently in the second distorted image than in the first distorted image. The instructions 1156, when executed by the one or more processors, further cause the one or more processors to provide the second distorted image as input to the adapted network to generate a second modified image. The instructions 1156, when executed by the one or more processors, further cause the one or more processors to generate a video output including the first modified image and the second modified image without visible artifacts due to distortion differences between the first distorted image and the second distorted image.

In a particular aspect, the instructions 1156, when executed by one or more processors (e.g., the one or more processors 120, the processor 1106, or the processor 1110, as illustrative examples), cause the one or more processors to obtain, from a stream of video data, first image data representing a first distorted image depicting an object. The first image data corresponds to multiple channels. The instructions 1156, when executed by the one or more processors, also cause the one or more processors to provide the first image data as input to an adapted network to generate first modified image data. The first modified image data corresponds to fewer channels than the first image data. The instructions 1156, when executed by the one or more processors, further cause the one or more processors to generate first output image data based at least in part on the first modified image data. The instructions 1156, when executed by the one or more processors, also cause the one or more processors to generate a video output including the first output image data.

The memory 1152 may include program data 1158. In a particular aspect, the program data 1158 includes or indicates the video data 110, the video data 114, the first distortion 105, the second distortion 107, the adapted network 134, the one or more adapted networks 130, the network characteristics 150, the network characteristics 154, the first modified image 121, the second modified image 123, the first distorted image 111, the second distorted image 113, the first output image 141, the second output image 143, the first image 101, the second image 103, the first image 131, the second image 133, or a combination thereof. The device 1100 may include a wireless controller 1140 coupled, via a transceiver 1150, to an antenna 1142. The device 1100 may include a display 1128 coupled to a display controller 1126. In a particular aspect, the display 1128 includes the display device 144 of FIG. 1, the screen 920 of FIG. 9, the display 1020 of FIG. 10A, or a combination thereof.

One or more speakers 1136 and one or more microphones 1146 may be coupled to the CODEC 1134. The CODEC 1134 may include a digital-to-analog converter (DAC) 1102 and an analog-to-digital converter (ADC) 1104. In a particular implementation, the CODEC 1134 may receive analog signals from the microphone 1146, convert the analog signals to digital signals using the analog-to-digital converter 1104, and provide the digital signals to the processor 1110. The processor 1110 (e.g., a speech and music codec) may process the digital signals, and the digital signals may further be processed by the video processor 122. In a particular implementation, the processor 1110 (e.g., the speech and music codec) may provide digital signals to the CODEC 1134. The CODEC 1134 may convert the digital signals to analog signals using the digital-to-analog converter 1102 and may provide the analog signals to the speakers 1136. The device 1100 may include an input device 1130. In a particular aspect, the input device 1130 includes the sensors 950 of FIG. 9, the sensors 1050 of FIG. 10A, or a combination thereof.

In a particular implementation, the device 1100 may be included in a system-in-package or system-on-chip device 1122. In a particular implementation, the memory 1152, the processor 1106, the processor 1110, the display controller 1126, the CODEC 1134, the wireless controller 1140, and the transceiver 1150 are included in a system-in-package or system-on-chip device 1122. In a particular implementation, the input device 1130 and a power supply 1144 are coupled to the system-in-package or system-on-chip device 1122. Moreover, in a particular implementation, as illustrated in FIG. 11, the display 1128, the input device 1130, the speaker 1136, the microphone 1146, the antenna 1142, and the power supply 1144 are external to the system-in-package or system-on-chip device 1122. In a particular implementation, each of the display 1128, the input device 1130, the speaker 1136, the microphone 1146, the antenna 1142, and the power supply 1144 may be coupled to a component of the system-in-package or system-on-chip device 1122, such as an interface or a controller.

The device 1100 may include a voice activated device, an audio device, a wireless speaker and voice activated device, a portable electronic device, a car, a vehicle, a computing device, a communication device, an internet-of-things (IoT) device, a virtual reality (VR) device, a smart speaker, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, or any combination thereof. In a particular aspect, the processor 1106, the processor 1110, or a combination thereof, are included in an integrated circuit.

In conjunction with the described implementations, an apparatus includes means for obtaining, from a stream of video data, a first distorted image depicting an object. For example, the means for obtaining includes the video processor 122, the one or more processors 120, the device 102 of FIG. 1, the processor 1106, the processor 1110, one or more other circuits or components configured to obtain a distorted image from a stream of video data, or any combination thereof.

The apparatus also includes means for providing the first distorted image as input to an adapted network to generate a first modified image. For example, the means for providing includes the video processor 122, the one or more processors 120, the device 102 of FIG. 1, the processor 1106, the processor 1110, one or more other circuits or components configured to provide a distorted image as input to an adapted network to generate a modified image, or any combination thereof. The adapted network 134 is configured to generate a modified image based on a single input image.

The apparatus further includes means for obtaining, from the stream of video data, a second distorted image depicting the object. For example, the means for obtaining includes the video processor 122, the one or more processors 120, the device 102 of FIG. 1, the processor 1106, the processor 1110, one or more other circuits or components configured to obtain a distorted image from a stream of video data, or any combination thereof. The object 140 is distorted differently in the second distorted image 113 than in the first distorted image 111.

The apparatus also includes means for providing the second distorted image as input to the adapted network to generate a second modified image. For example, the means for providing includes the video processor 122, the one or more processors 120, the device 102 of FIG. 1, the processor 1106, the processor 1110, one or more other circuits or components configured to provide a distorted image as input to an adapted network to generate a modified image, or any combination thereof.

The apparatus further includes means for generating a video output including the first modified image and the second modified image without visible artifacts due to distortion differences between the first distorted image and the second distorted image. For example, the means for generating a video output includes the video processor 122, the one or more processors 120, the device 102 of FIG. 1, the processor 1106, the processor 1110, one or more other circuits or components configured to generate a video output including the first modified image and the second modified image without visible artifacts due to distortion differences between the first distorted image and the second distorted image, or any combination thereof.

Also, in conjunction with the described implementations, an apparatus includes means for obtaining, from a stream of video data, first image data representing a first distorted image depicting an object. For example, the means for obtaining includes the video processor 122, the one or more processors 120, the device 102 of FIG. 1, the processor 1106, the processor 1110, one or more other circuits or components configured to obtain image data representing a distorted image depicting an object, or any combination thereof. The first image data (e.g., the first distorted image 111) corresponds to multiple channels.

The apparatus also includes means for providing the first image data as input to an adapted network to generate first modified image data. For example, the means for providing includes the video processor 122, the one or more processors 120, the device 102 of FIG. 1, the processor 1106, the processor 1110, one or more other circuits or components configured to provide image data as input to an adapted network to generate a modified image, or any combination thereof. The first modified image data (e.g., the first modified image 121) corresponds to fewer channels than the first image data.

The apparatus further includes means for generating first output image data based at least in part on the first modified image data. For example, the means for generating includes the video processor 122, the one or more processors 120, the device 102 of FIG. 1, the processor 1106, the processor 1110, one or more other circuits or components configured to generate output image data based at least in part on modified image data, or any combination thereof.

The apparatus also includes means for generating a video output including the first output image data. For example, the means for generating includes the video processor 122, the one or more processors 120, the device 102 of FIG. 1, the processor 1106, the processor 1110, one or more other circuits or components configured to generate a video output including output image data, or any combination thereof.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device configured to process images of a stream of video data, the device comprising:
a memory configured to store an adapted network that is configured to generate a modified image based on a single input image; and
a processor configured to:
obtain, from a stream of video data, a first distorted image depicting an object;
provide the first distorted image as input to the adapted network to generate a first modified image;
obtain, from the stream of video data, a second distorted image depicting the object, wherein the object is distorted differently in the second distorted image than in the first distorted image;
provide the second distorted image as input to the adapted network to generate a second modified image; and
generate a video output including the first modified image and the second modified image without visible artifacts due to distortion differences between the first distorted image and the second distorted image.

2. The device of claim 1, wherein the distortion differences are based on spatial aliasing differences between the first distorted image and the second distorted image.

3. The device of claim 1, wherein the distortion differences are based on downscaling aliasing artifacts caused by a sub-pixel shift of the depiction of the object in the second distorted image relative to the depiction of the object in the first distorted image.

4. The device of claim 1, wherein the distortion differences are based on compression artifacts caused by compression used to generate the first distorted image and the second distorted image.

5. The device of claim 1, wherein the distortion differences are caused due to hand jitter between capturing a first image corresponding to the first distorted image and capturing a second image corresponding to the second distorted image.

6. The device of claim 1, wherein the distortion differences are caused to due to movement of the object between capturing a first image corresponding to the first distorted image and capturing a second image corresponding to the second distorted image.

7. The device of claim 1, wherein the memory is configured to store a set of adapted networks that includes the adapted network, and wherein the processor is configured to select the adapted network from the set of adapted networks based on a selection criterion.

8. The device of claim 7, wherein the selection criterion is based on a user, a location, a purpose, an event, or a combination thereof.

9. The device of claim 7, wherein the selection criterion is based on default data, a configuration setting, a user input, a sensor input, or a combination thereof.

10. The device of claim 1, wherein the first distorted image is generated by downscaling a first image to generate a downscaled image, compressing the downscaled imaged to generate a compressed image, and decompressing the compressed image.

11. The device of claim 1, further comprising a receiver configured to receive a compressed image from a second device, wherein the processor is configured to generate the first distorted image by decompressing the compressed image.

12. The device of claim 1, wherein the adapted network is used to generate the second modified image independently of data associated with the first distorted image.

13. The device of claim 1, wherein the first distorted image includes first channel data corresponding to one or more first channels and second channel data corresponding to one or more second channels, and wherein the processor is further configured to:
provide the first channel data and the second channel data to the adapted network to generate first modified data, the first modified data corresponding to the one or more first channels;
generate, based on the second channel data, second modified data independently of the adapted network, the second modified data corresponding to the one or more second channels; and
generating the first modified image based on the first modified data and the second modified data.

14. The device of claim 13, wherein the first channel data includes luma information of the first distorted image, and wherein the second channel data includes chrominance information of the first distorted image.

15. The device of claim 1, wherein the adapted network includes a convolutional neural network (CNN), a multi-layer perceptron (MLP) neural network, or a recurrent neural network (RNN).

16. The device of claim 1, wherein the processor is further configured to update the adapted network based at least in part on a comparison of the first modified image and a first target image, wherein the first target image is based on a first image, and wherein the first distorted image is generated by applying a distortion to the first image.

17. The device of claim 1, wherein the adapted network has been trained using a batch of training image pairs including a particular image pair having a first target image and a particular distorted image of a plurality of distorted images, wherein the first target image is based on a first image, and wherein the plurality of distorted images is generated based on distortions applied to the first image.

18. The device of claim 1, wherein the adapted network has been trained using a particular image pair that includes a first target image and a particular distorted image, wherein the particular distorted image is generated by applying a distortion to a first image, wherein the first target image is based on the first image, and wherein the adapted network has been trained using the particular image pair by:
providing the particular distorted image as input to the adapted network to generate a particular modified image; and
updating the adapted network based at least in part on a comparison of the particular modified image and the first target image.

19. The device of claim 1, wherein the adapted network has been trained using a particular image pair that includes a first target image and a particular distorted image, wherein the particular distorted image is generated by applying a particular compression level to compress a first image, and wherein the first target image is based on the first image.

20. The device of claim 19, wherein the adapted network has been trained using a batch of training image pairs that includes at least the particular image pair and a second particular image pair, wherein the second particular image pair includes a second target image and a second particular distorted image, wherein the second target image is based on the first image, wherein the second particular distorted image is generated by applying a second compression level to compress the first image, and wherein the second compression level is distinct from the particular compression level.

21. The device of claim 1, wherein the adapted network has been trained using a particular image pair that includes a first target image and a particular distorted image, wherein the first target image is generated by applying a particular pixel shift to a first image, and wherein the particular distorted image is generated by downscaling the first target image.

22. The device of claim 21, wherein the adapted network has been trained using a batch of training image pairs that includes at least the particular image pair and a second particular image pair, wherein the second particular image pair includes a second target image and a second particular distorted image, wherein the second target image is generated by applying a second particular pixel shift to the first image, wherein the second particular distorted image is generated by downscaling the second target image, and wherein the particular distorted image has a sub-pixel shift relative to the second particular distorted image.

23. The device of claim 1, wherein the adapted network has been trained using a particular image pair that includes a first target image and a particular distorted image, wherein the first target image is generated by applying a particular pixel shift to a first image, and wherein the particular distorted image is generated by downscaling the first image to generate a first downscaled image and applying a first interpolation to the first downscaled image.

24. The device of claim 23, wherein the adapted network has been trained using a batch of training image pairs that includes at least the particular image pair and a second particular image pair, wherein the second particular image pair includes a second target image and a second particular distorted image, wherein the second target image is generated by applying a second particular pixel shift to the first image, and wherein the second particular distorted image is generated by applying a second interpolation to the first downscaled image.

25. The device of claim 1, wherein the adapted network has been trained using a generative adversarial network (GAN) technique.

26. The device of claim 1, wherein the first distorted image has a first resolution that is lower than a second resolution of the first modified image.

27. A device configured to process images of a stream of video data, the device comprising:
a memory configured to store an adapted network that is configured to generate a modified image based on a single input image, the adapted network trained using at least one batch of training image pairs, wherein a plurality of image pairs of the batch of training image pairs is based on a first image, wherein a first particular image pair of the batch of training image pairs includes a first particular target image and a first particular distorted image, wherein a second particular image pair of the batch of training image pairs includes a second particular target image and a second particular distorted image, wherein each of the first particular target image and the second particular target image is based on the first image, wherein the first particular distorted image is based on applying a first distortion to the first image, and wherein the second particular distorted image is based on applying a second distortion, that is distinct from the first distortion, to the first image; and
a processor configured to:
obtain, from a stream of video data, a first distorted image depicting an object;
provide the first distorted image as input to the adapted network to generate a first modified image;
obtain, from the stream of video data, a second distorted image depicting the object, wherein the object is distorted differently in the second distorted image than in the first distorted image;
provide the second distorted image as input to the adapted network to generate a second modified image; and
generate a video output including the first modified image and the second modified image without visible artifacts due to distortion differences between the first distorted image and the second distorted image.

28. The device of claim 27, wherein the adapted network has been trained using each particular image pair of the batch of training image pairs by:
providing a particular distorted image of the particular image pair as input to the adapted network to generate a particular modified image; and
updating the adapted network based on a comparison of the particular modified image and a particular target image of the particular image pair.

29. The device of claim 27, wherein the particular distorted image is generated by applying a particular compression level to compress the first image.

30. The device of claim 27, wherein the particular target image includes the first image or a pixel shifted version of the first image.

31. A method of processing images of a stream of video data, the method comprising:
obtaining, from a stream of video data, first image data representing a first distorted image depicting an object, the first image data corresponding to multiple channels;
providing the first image data as input to an adapted network to generate first modified image data, the first modified image data corresponding to fewer channels than the first image data;
generating first output image data based at least in part on the first modified image data; and
generating a video output based on the first output image data.

32. The method of claim 31, wherein the first image data includes first channel data corresponding to one or more first channels and second channel data corresponding to one or more second channels, and wherein the first modified image data corresponds to the one or more first channels and is independent of the one or more second channels.

33. The method of claim 32, further comprising generating, based on the first image data, second modified image data independently of the adapted network, the second modified image data independent of the one or more first channels and corresponding to the one or more second channels, wherein the first output image data is further based on the second modified image data.

34. The method of claim 33, wherein the second modified image data represents chrominance information and omits luma information.

35. The method of claim 32, wherein the first channel data includes luma information and the second channel data includes chrominance information.

36. The method of claim 31, wherein a particular pixel of the first image data is represented by a first pixel value corresponding to a first channel of the multiple channels, wherein a corresponding pixel of the first modified image data is represented by a second pixel value corresponding to the first channel, and wherein the second pixel value is modified relative to the first pixel value.

37. The method of claim 31, wherein the first modified image data represents luma information and omits chrominance information.

38. The method of claim 31, wherein the first image data has a first resolution that is lower than a second resolution of the first output image data.

39. The method of claim 31, wherein the first image data represents at least first color information and second color information, and wherein the first modified image data represents the first color information and omits the second color information.

* * * * *